US011992920B2

United States Patent

(12) United States Patent
Tamura et al.

(10) Patent No.: US 11,992,920 B2
(45) Date of Patent: May 28, 2024

(54) POWER TOOL

(71) Applicant: KOKI HOLDINGS CO., LTD., Tokyo (JP)

(72) Inventors: Kengo Tamura, Hitachinaka (JP); Junichi Toukairin, Hitachinaka (JP); Yoshihiro Komuro, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 218 days.

(21) Appl. No.: 16/632,201

(22) PCT Filed: Aug. 31, 2018

(86) PCT No.: PCT/JP2018/032392
§ 371 (c)(1),
(2) Date: Jan. 17, 2020

(87) PCT Pub. No.: WO2019/065086
PCT Pub. Date: Apr. 4, 2019

(65) Prior Publication Data
US 2020/0215667 A1 Jul. 9, 2020

(30) Foreign Application Priority Data
Sep. 29, 2017 (JP) ................................ 2017-190508

(51) Int. Cl.
*B25B 21/02* (2006.01)
*B25B 23/00* (2006.01)

(52) U.S. Cl.
CPC .......... *B25B 21/02* (2013.01); *B25B 23/0035* (2013.01)

(58) Field of Classification Search
CPC ............................ B25B 21/02; B25B 23/0035
See application file for complete search history.

(56) References Cited

U.S. PATENT DOCUMENTS 4,865,485 A * 9/1989 Finnefrock, Sr. ..... F16B 21/165 403/17
5,038,869 A * 8/1991 Olson ...................... F16D 1/06 81/177.85

(Continued)

FOREIGN PATENT DOCUMENTS

CN 1672879 A 9/2005
CN 1782445 A 6/2006

(Continued)

OTHER PUBLICATIONS

Extended European Search Report dated May 31, 2021 in corresponding PCT/JP2018/032392.

(Continued)

*Primary Examiner* — Daniel Jeremy Leeds
(74) *Attorney, Agent, or Firm* — NovoTechIP International PLLC

(57) ABSTRACT

An electric tool to restrain stress concentration is provided. The electric tool includes a housing (7, 8), a motor (2), an anvil (5, 105), and an impact mechanism (4). The motor is accommodated in the housing and rotatable. The anvil supported by the housing and rotatable about an axis (A). The impact mechanism is configured to convert a rotational force generated by the motor into a rotational impact force about the axis, and to apply the rotational impact force to the anvil. The anvil includes a base portion (51), an end bit attachment portion (80, 180), and a connecting portion (90, 190). The base portion is rotatably supported by the housing. An end bit is attachable to the end bit attachment portion. The end bit attachment portion has a flat surface portion. The connecting portion integrally connects together the base portion and the end bit attachment portion. The connecting portion has a diameter gradually reduced in a direction from the base portion toward the end bit attachment portion. The connecting portion is formed with a recessed portion (93, 94, (Continued)

193A, 193B, 194). The connecting portion has an outer peripheral surface portion where the recessed portion is formed. The recessed portion is recessed, in an axial direction from the end bit attachment portion toward the base portion, from a point where the recessed portion is connected to the outer peripheral surface portion in a cross-section taken along a plane parallel to the flat surface portion and passing through the recessed portion.

10 Claims, 14 Drawing Sheets

(56) References Cited

U.S. PATENT DOCUMENTS

| | | | | |
|---|---|---|---|---|
| D384,563 | S * | 10/1997 | Robinson | D8/70 |
| 7,249,638 | B2 * | 7/2007 | Bodine | B25B 21/02 173/171 |
| 8,342,061 | B2 * | 1/2013 | Super | B25B 15/001 81/177.85 |
| 8,839,879 | B2 * | 9/2014 | Elger | B25D 17/005 173/132 |
| 9,669,526 | B2 * | 6/2017 | Ely | B25B 23/0035 |
| 2005/0022638 | A1 * | 2/2005 | Milbourne | B25B 21/026 81/466 |
| 2006/0118316 | A1 | 6/2006 | Clark et al. | |
| 2008/0087448 | A1 | 4/2008 | Happ | |
| 2010/0326249 | A1 * | 12/2010 | Super | B25B 15/001 81/177.85 |
| 2011/0056714 | A1 | 3/2011 | Elger et al. | |
| 2014/0262394 | A1 * | 9/2014 | Scott | B25B 23/0007 173/48 |
| 2015/0352699 | A1 | 12/2015 | Sakai et al. | |

FOREIGN PATENT DOCUMENTS

| | | | |
|---|---|---|---|
| CN | 201350613 | Y | 11/2009 |
| CN | 102083594 | A | 6/2011 |
| CN | 104936746 | A | 9/2015 |
| DE | 20118029 | U1 | 1/2002 |
| JP | H0360982 | A | 3/1991 |
| JP | 2005279922 | A | 10/2005 |
| JP | 2014140930 | A | 8/2014 |
| WO | 2009137690 | A1 | 11/2009 |

OTHER PUBLICATIONS

International Search Report and Written Opinion dated Oct. 23, 2018 by the International Searching Authority (Japan Patent Office) in PCT Application PCT/JP2018/032392 (English Translation of the ISR).

English Language Translation of International Preliminary Report on Patentability dated Apr. 9, 2020 in corresponding PCT/JP2018/032392.

Chinese First Office Action dated Dec. 3, 2020 in Chinese Patent Application No. 201880050101.6 (English Translation Provided).

* cited by examiner

FIG. 10
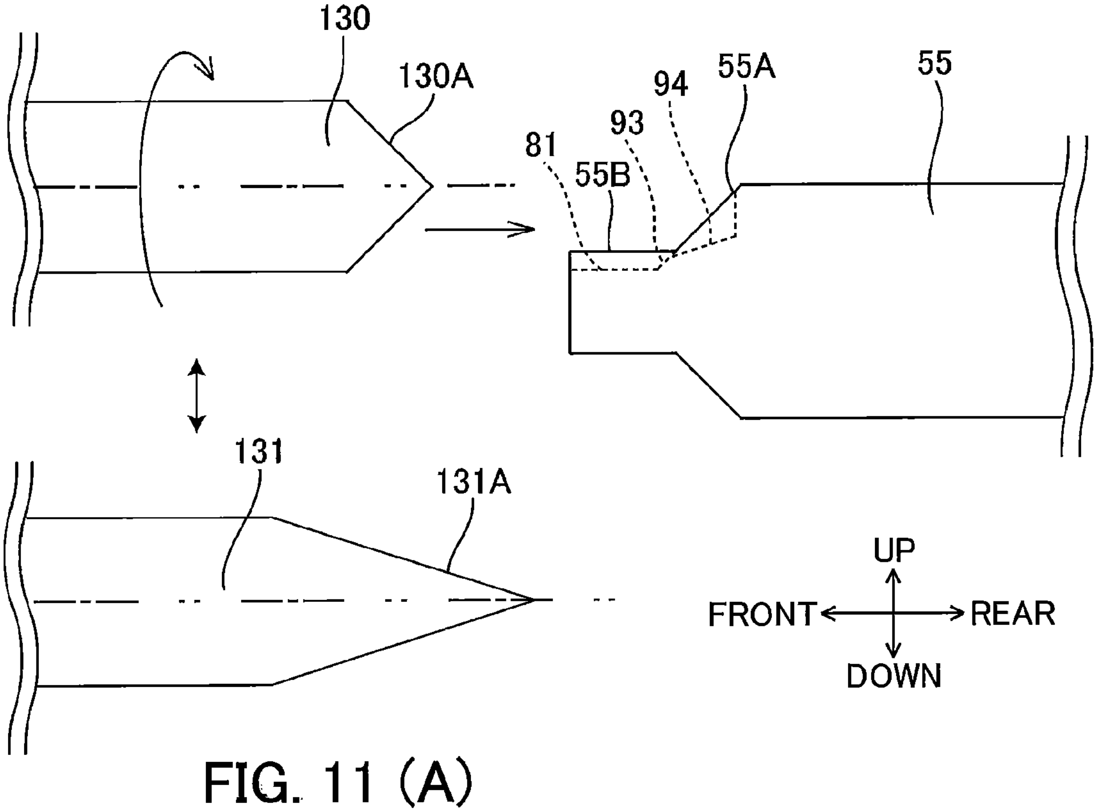
FIG. 11 (A)
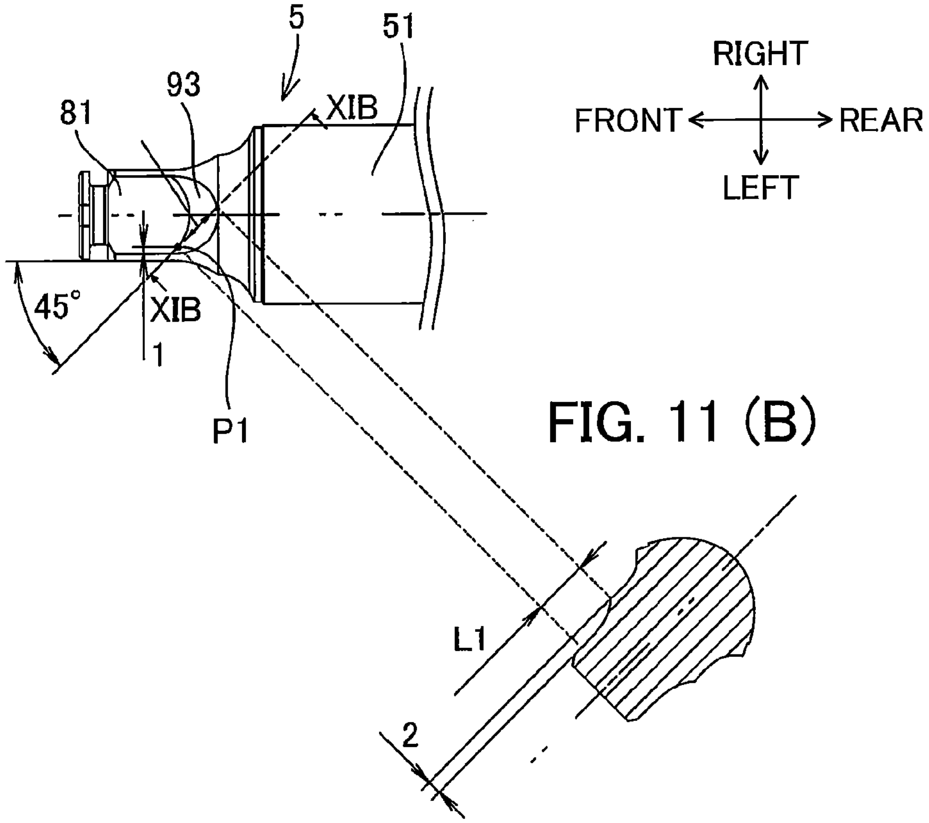
FIG. 11 (B)

POWER TOOL

TECHNICAL FIELD

The present invention relates to a power tool provided with an impact mechanism.

BACKGROUND ART

Conventionally, an impact tool such as an impact driver and an impact wrench is known as an electric power tool where rotation of a motor is converted to a rotational impacting force through an impact mechanism and the force is transmitted to an end bit.

For example, Patent Literature PTL1 discloses an impact tool provided with an impact mechanism including a hammer rotatable by the rotational driving force from a motor, and an anvil having an attachment portion to which an end bit is attached. The hammer drivingly rotated by the motor rotationally impacts the anvil. Operation for fastening a fastener such as a screw and a bolt is performed by the rotation of the end bit attached to the attachment portion.

CITATION LIST

Patent Literature

[PTL 1]
Japanese Patent Application Publication No. 2014-140930

SUMMARY OF INVENTION

Technical Problem

However, according to the conventional impact tool, stress concentration occurs at a particular portion of the anvil when large torque is generated during fastening operation, and damage to the anvil may occur starting from the stress concentrating portion.

Therefore, it is an object of the present invention to provide an electric power tool provided with an anvil capable of restraining stress concentration.

Solution to Problem

In order to attain the above-described object, the present invention provides an electric tool. The electric power tool includes a housing, a motor, an anvil and an impact mechanism. The motor is accommodated in the housing and rotatable. The anvil is supported by the housing and rotatable about an axis. The impact mechanism is configured to convert a rotational force generated by the motor into a rotational impact force about the axis, and to apply the rotational impact force to the anvil. The anvil includes a base portion, an end bit attachment portion, and a connecting portion. The base portion is rotatably supported by the housing. An end bit is attachable to the end bit attachment portion. The end bit attachment portion has a flat surface portion. The connecting portion integrally connects together the base portion and the end bit attachment portion. The connecting portion has a diameter gradually reduced, in a direction from the base portion toward the end bit attachment portion. The connecting portion is formed with a recessed portion. The connecting portion has an outer peripheral surface portion where the recessed portion is formed. The recessed portion is recessed, in an axial direction from the end bit attachment portion toward the base portion, from a point where the recessed portion is connected to the outer peripheral surface portion in a cross-section taken along a plane parallel to the flat surface portion and passing through the recessed portion.

According to the electric tool described above, since the recessed portion is formed, concentration of stress on a specific point of the anvil can be restrained.

Preferably, the recessed portion is in contact with the flat surface portion. Or, preferably, the recessed portion is separated from the flat surface portion.

Preferably, the recessed portion includes a first recessed portion in contact with the flat surface portion, and a second recessed portion separated from the flat surface portion.

Preferably, the recessed portion has a curved-line shape recessed in the axial direction in the cross-section. Preferably, the connecting portion has an outer peripheral surface portion where the recessed portion is formed. The recessed portion is recessed, in an axial direction, from a point where the recessed portion is connected to the outer peripheral surface portion in a cross-section taken along a plane parallel to the flat surface portion and passing through the recessed portion. Preferably, the recessed portion has a curved-line shape recessed in the axial direction in the cross-section. Preferably, the recessed portion has an arcuate shape recessed in the axial direction in the cross-section. Preferably, the recessed portion has a parabolic-curve shape recessed in the axial direction in the cross-section.

Advantageous Effects of Invention

According to the present invention, the electric power tool including the anvil capable of restraining stress concentration can be provided.

BRIEF DESCRIPTION OF DRAWINGS

FIG. 10 is a view for description of a method of producing the anvil according to the embodiment of the present invention;

FIG. 11 is a view illustrating the anvil according to the embodiment of the present invention, where (A) is a plan view of the anvil, (B) is a cross-sectional view taken along a line XIB-XIB of (A);

DESCRIPTION OF EMBODIMENTS

An impact wrench 1 as an example of an electric power tool according to an embodiment of the present invention will be described with reference to FIGS. 1 through 5. The impact wrench 1 is an electrically powered power tool for fastening a fastener (such as a bolt and a screw) to a workpiece (such as steel and wood).

In the following description, directions of "upward", "downward", "frontward", and "rearward" will be defined on a basis of FIG. 1. Further, directions of "rightward" and "leftward" will be defined when the impact wrench is observed frontward from behind. Further in reference to dimension, numerical value, and shape, etc. not only completely identical dimension, completely identical numerical value, and completely identical shape, but also approximately the same dimension, approximately the same numerical value, and approximately the same shape due to production error should be within the meanings of these words. Similarly, the terms "identical", "perpendicular", "parallel", "coincident", and "flush with", and etc. should be construed to encompass the meanings of "approximately the same", "approximately perpendicular", "approximately parallel", "generally coincident", and "approximately flush with".

Figure 1:
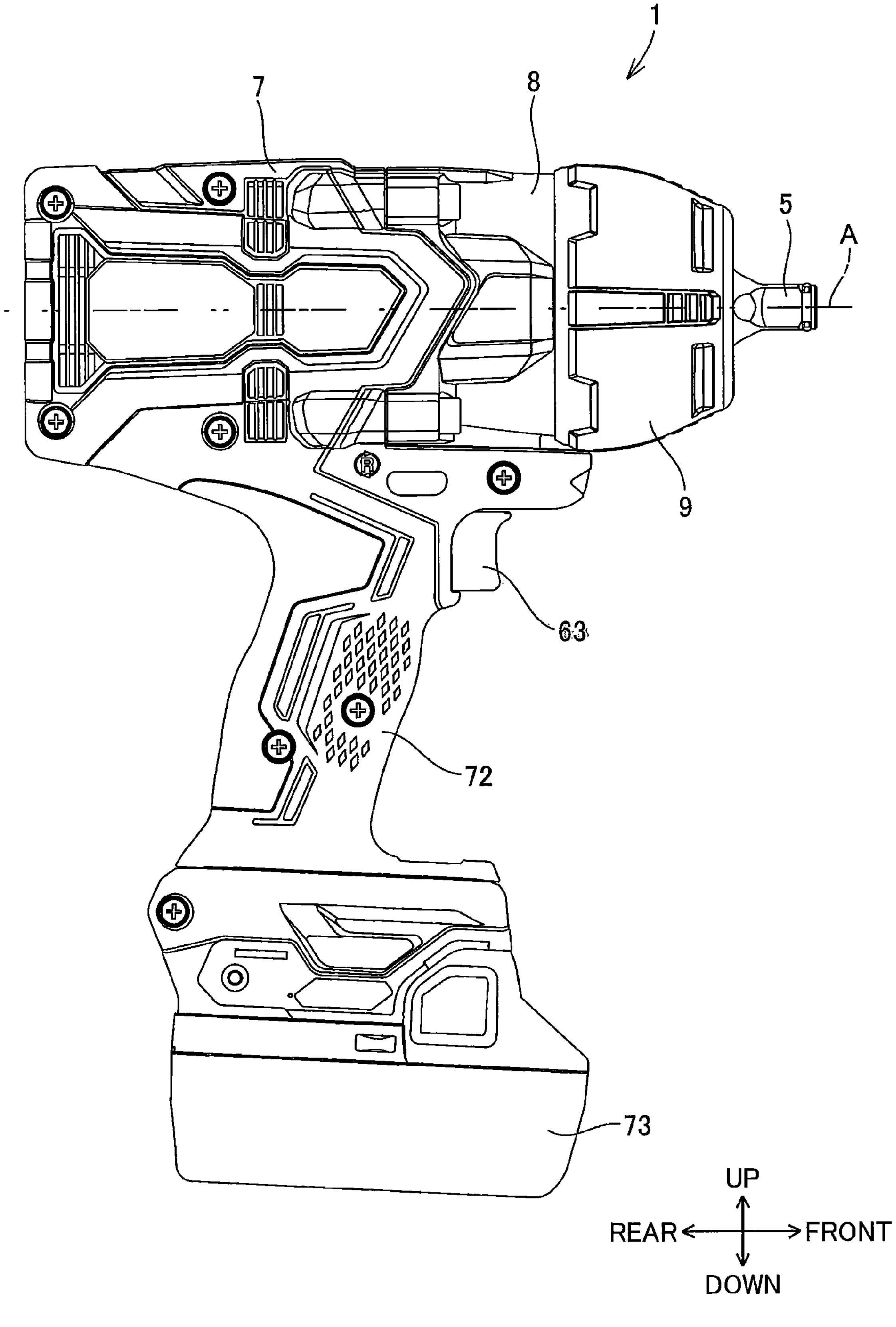
FIG. 1 is an external view illustrating an impact wrench according to an embodiment of the present invention.
Figure 2:
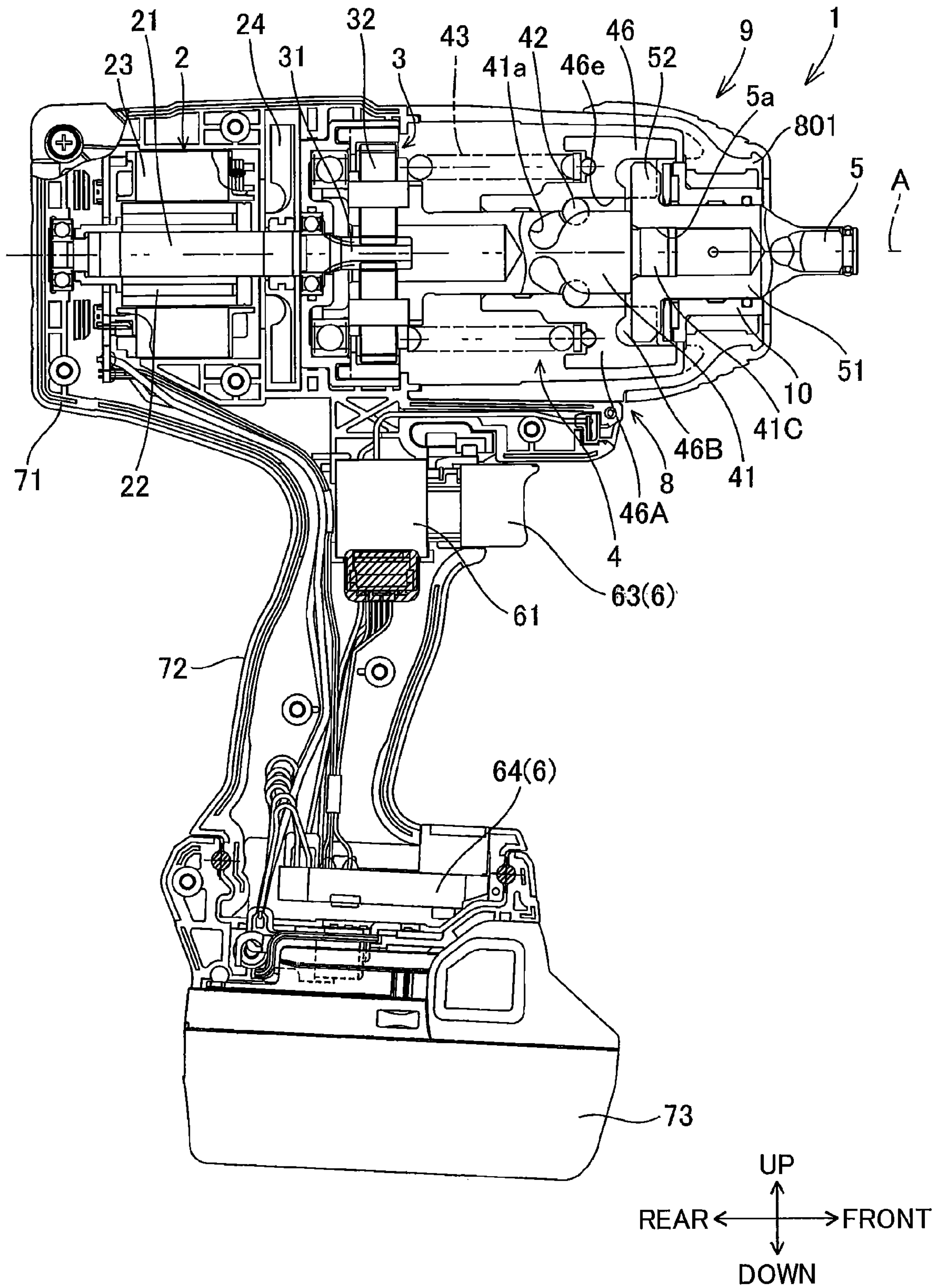
FIG. 2 is a cross-sectional view of the impact wrench according to the embodiment of the present invention.

The impact wrench 1 illustrated in FIGS. 1 and 2 is an electrically powered fastening tool. As illustrated in FIG. 2, the impact wrench 1 includes a motor 2, a gear mechanism 3, an impact mechanism 4, an anvil 5, a controller 6, and a battery pack 73.

As illustrated in FIGS. 1 and 2, the impact wrench 1 has: an outer shell including a housing 7 accommodating therein the motor 2; a hammer case 8 accommodating therein the gear mechanism 3 and the impact mechanism 4; and a cover 8 covering an outer peripheral surface of the hammer case 8.

The housing 7 is made from resin, and includes a barrel portion 71 and a handle portion 72. The barrel portion 71 is generally hollow cylindrical. The barrel portion 71, in cooperation with the hammer case 8, accommodates therein the motor 2, the gear mechanism 3, the impact mechanism 4, and the anvil 5 arrayed in this order in the frontward direction.

The handle portion 72 extends downward from a front end portion of a lower surface of the barrel portion 71. The handle portion 72 is integral with the barrel portion 71.

The hammer case 8 is made from aluminum, and is positioned frontward of the barrel portion 71, and generally hollow cylindrical. The hammer case 8 includes a reduced diameter portion 801.

The reduced diameter portion 801 is generally hollow cylindrical and extends in the frontward/rearward direction. The reduced diameter portion 801 has an inner peripheral surface to which a bearing metal 10 is fixed by force-fitting. The reduced diameter portion 801 has a front end portion forming an opening.

The cover 9 is made from resin, and is positioned to cover a front end portion of an outer peripheral surface of the hammer case 8. The cover 9 has a front end portion forming an opening.

As illustrated in FIG. 2, the motor 2 is a brushless motor including a rotation shaft 21, a rotor 22, a stator 23, and a fan 24.

The rotation shaft 21 extends in the frontward/rearward direction, and is rotatably supported by the barrel portion 71 through a bearing.

The rotor 22 includes a plurality of permanent magnets not illustrated, and extends in the frontward/rearward direction. The rotor 22 is fixed to the rotation shaft 21 to rotate integrally therewith.

The stator 23 includes a plurality of stator windings not illustrated. The stator 23 is fixed to the barrel portion 71 to surround the rotor 22.

The fan 24 is provided at the rotation shaft 21 and is positioned frontward of a front surface of the rotor 22. The fan 24 is fixed to the rotation shaft 21 to rotate integrally therewith.

As illustrated in FIG. 2, the gear mechanism 3 includes a pinion gear 31 positioned at a front end portion of the rotation shaft 21 of the motor 2, a pair of gears 32 in meshing engagement with the pinion gear 31, and an outer gear (not illustrated) in meshing engagement with the gears 32. The gear mechanism 3 is a planetary gear mechanism where the pinion gear 31 functions as a sun gear and the pair of gears 32 functions as planetary gears. The gear mechanism 3 is configured so that the rotation of the pinion gear 31 is deceleratingly transmitted to the impact mechanism 4.

Figure 3:
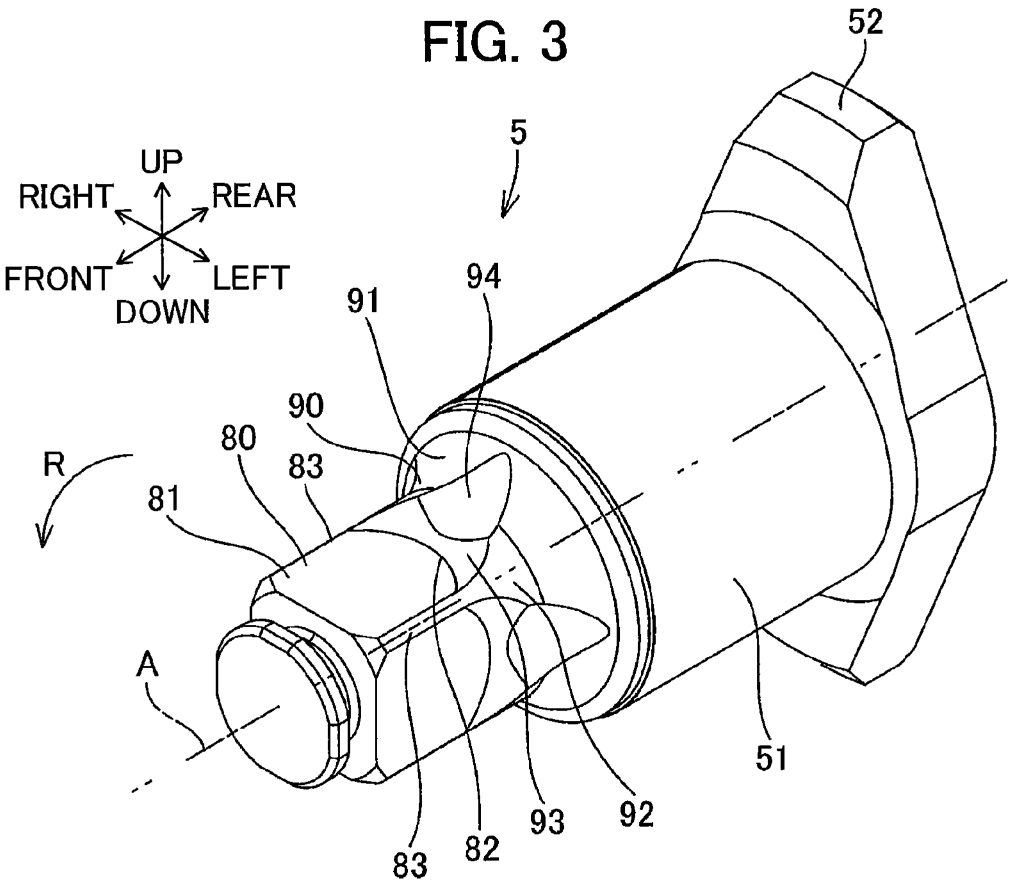
FIG. 3 is a perspective view of an anvil provided in the impact wrench according to the embodiment of the present invention.

As illustrated in FIGS. 1 through 3, the impact mechanism 4 includes a spindle 41, balls 42, a spring 43, and a hammer 46.

The spindle 41 has an outer peripheral surface formed with two grooves 41*a* having generally V-shape. The balls 42 are positioned at the grooves 41*a* so as to be movable along the grooves 41*a* in the frontward/rearward direction. The spring 43 is a coil spring disposed over the spindle 41. The spring 43 has an annular shape in the front view. The spindle 41 has a tip end portion forming a protruding portion 41C.

The spring 43 has a front end portion in abutment with the hammer 46 for urging the hammer 46 frontward. The spring 43 has a rear end portion in abutment with the spindle 41.

As illustrated in FIG. 2, the hammer 46 is positioned in the hammer case 8 and is rotatable about an axis A extending in the frontward/rearward direction. The hammer 46 includes a body portion 46A and a pair of pawls 46B (as indicated by dotted line in FIG. 2). The axis A is coincident with the rotation axis of the rotor 22.

The body portion 46A has an inner peripheral surface formed with two grooves 46*e* extending in the frontward/rearward direction and recessed radially outwardly. Each groove 46*e* is positioned in confrontation with each groove 41*a* of the spindle 41 so as to support the balls 42 in cooperation with the groove 41*a*. Hence, the hammer 46 is movable relative to the spindle 41 in the frontward/rearward direction and a circumferential direction. The pair of pawls 46B protrudes frontward from a front surface of the body portion 46A.

As illustrated in FIGS. 1 through 3, the anvil 5 is positioned in the hammer case 8, and includes a large diameter portion 51 (as an example of a base portion), a pair of blade portions 52, a tip end portion 80 (as an example of an end bit attachment portion), and a connecting portion 90 (as an example of a connecting portion) for integrally connecting together the large diameter portion 51 and the tip end portion 80.

The large diameter portion 51 extends in the frontward/rearward direction, and has a front end portion fittingly inserted in the bearing metal 10 so as to be supported by the bearing metal 10 and rotatable about the axis A. The large diameter portion 51 is formed with an engagement groove 5*a* (FIG. 2) extending in the frontward/rearward direction. The protruding portion 41C of the spindle 41 is fixed to the engagement groove 5*a* by force-fitting.

The blade portions 52 are integral with the large diameter portion 51. The blade portions 52 are positioned opposite to each other with respect to the axis A in a diametrical direction of the anvil 5.

The tip end portion 80 is provided at a front end of the large diameter portion 51, and is exposed to an outside through the openings of the hammer case 8 and the cover 9. A socket 100 (FIG. 9) as an end bit is attachable to the tip end portion 80. Details of the anvil 5 will be described later.

As illustrated in FIGS. 1 and 2, the controller 6 includes a trigger 63, and a circuit board 64. The trigger 63 is positioned at a front upper end portion of the handle portion 72. The trigger 63 is connected to a switch mechanism 61.

The switch mechanism 61 is accommodated within the handle portion 72. The switch mechanism 61 is configured to output to the circuit board 64 a tool start-up signal to energize the motor 2 in response to start-up operation (dragging operation) of the trigger 63, and to terminate output of the tool start-up signal in response to release of the dragging operation to the trigger 63, that is, in response to stopping operation.

The circuit board 64 is accommodated in a lower portion of the handle portion 72. The circuit board 64 includes switching elements not illustrated. The circuit board 64 is configured to alter switching operation made by the switching elements through the adjustment of electrical energy to be supplied to the motor 2 in accordance with dragging amount of the trigger 63, so as to control rotation speed of the motor 2.

The battery pack 73 contains a secondary battery not illustrated, and is attachable to and detachable from a lower end of the handle portion 72. Electric power from the secondary battery is supplied to the controller 6 and the motor 2.

Figure 4:
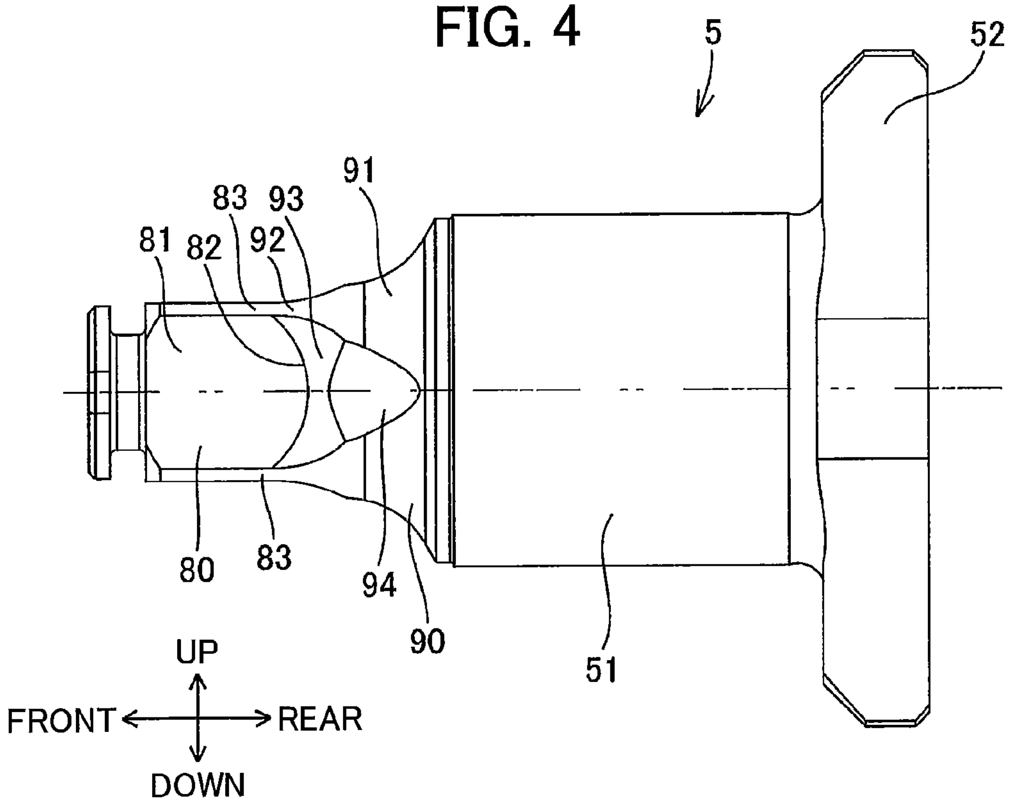
FIG. 4 is a side view of the anvil according to the embodiment of the present invention.
Figure 5:
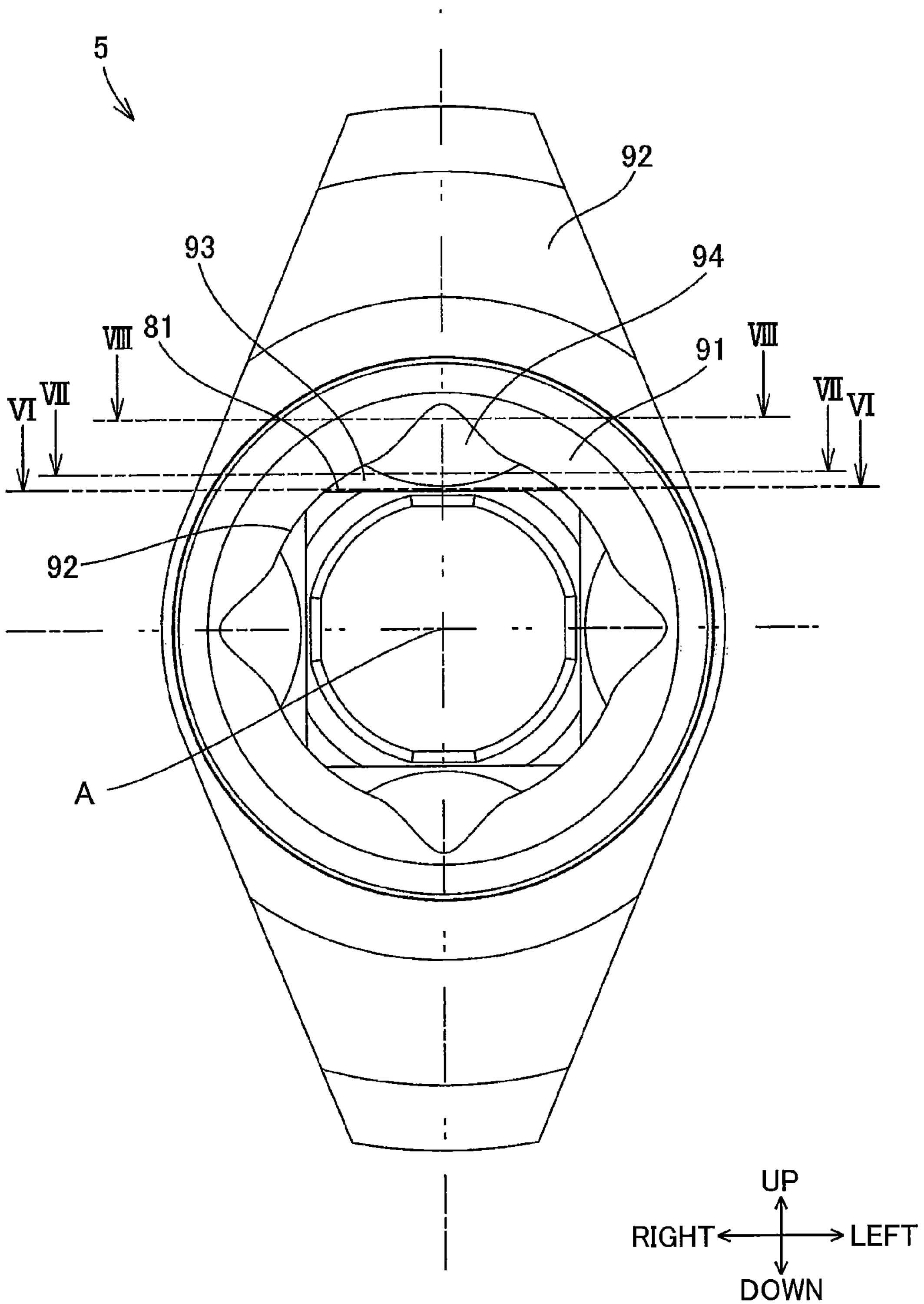
FIG. 5 is a front view of the anvil according to the embodiment of the present invention.

Details of the anvil 5 will be described. As illustrated in FIGS. 3 through 5, the large diameter portion 51 is generally solid cylindrical that is coaxial with the axis A. The tip end portion 80 has generally square shape in the front view to which the socket 100 (FIG. 9) as the end bit is attachable. Specifically, the front end portion 80 has four flat surface portions 81 each having generally square shape (FIG. 5) extending in the frontward/rearward direction, and four corner portions 83 chamfered and connecting neighboring two flat surfaces 81 together. The front end portion 80 is symmetrical about the axis A through rotation of every 90 degrees. Accordingly, the four flat surface portions 81 are symmetrically positioned about the axis A through rotation of 90 degrees. That is, using one specific flat surface portion 81 as a base, remaining three flat surface portions 81 are positioned at angularly 90 degrees, 180 degrees, and 270 degrees away from the specific flat surface portion 81. The corner portions 83 extend in the frontward/rearward direction.

In the following description, an uppermost flat surface portion 81 among the four flat surfaces 81 illustrated in FIG. 3 will be described. As described above, since the four flat surface portions 81 are symmetrically positioned about the axis A through rotation of every 90 degrees, configuration of the four flat surface portions 81 are identical to one another. Therefore, description as to the remaining flat surface portions 81 will be omitted.

A curved end portion 82 is formed at a rear end of the flat surface portion 81. The curved end portion 82 is positioned between two corner portions 83 (a right corner portion 83 and a left corner portion 83 in FIG. 3) and has a shape recessed rearward. Specifically, the curved end portion 82 has a generally arcuate shape having a rearmost portion positioned at a center of the curved end portion in a leftward/rightward direction. The curved end portion 82 has a continuous and smooth profile. In other words, the curved end portion 82 may have a constant radius of curvature or have a curvature whose radius is continuously changed.

The connecting portion 90 includes a sloped surface portion 91, four uniform diameter surface portions 92, four first curved surface portions 93 (as an example of a recessed portion and a first recessed portion), and four second curved surface portions 94 (as an example of a recessed portion and a second recessed portion). The connecting portion 90 is symmetrical about the axis through rotation of every 90 degrees. Accordingly, the four uniform diameter surface portions 92, the four first curved surface portions 93, and the four second curved surface portions 94 are respectively symmetrically positioned about the axis A through rotation of every 90 degrees. In the following description, an uppermost first curved surface portion 93 illustrated in FIG. 3, an uppermost second curved surface portion 94 connected to the uppermost first curved surface portion 93, and uppermost two uniform diameter surface portions 92 will be described while omitting description as to remaining first curved surface portions 93, remaining second curved surface portions 94, and remaining uniform diameter portions 92.

The sloped surface portion 91 is generally cylindrical with its radius (a distance from the axis A to an outer peripheral surface of the sloped surface portion 91) gradually reduced in frontward direction. The sloped surface portion 91 has a rear end whose radius is coincident with a radius of the large diameter portion 51, and has a front end whose radius is coincident with a radius of the uniform diameter surface portion 92. The rear end of the sloped surface portion 91 is connected to the front end of the large diameter portion 51. The front end of the sloped surface portion 91 is connected to the rear ends of the uniform diameter surface portions 92 and rear ends of the second curved surface portions 94.

The uniform diameter surface portion 92 has a constant radius (from the axis A to an outer peripheral surface of the uniform diameter surface portion 92). The radius is smaller than the radius of the large diameter portion 51 and not more than the radius of the sloped surface portion 91. Each uniform diameter surface portion 92 is at an angular position the same as that of a corner portion 83 in the circumferential direction. The uniform diameter surface portion 92 has a front end connected to the corner portion 83.

The first curved surface portion 93 is positioned between two uniform diameter surface portions 92 in the circumferential direction. The first curved surface portion 93 is at an angular position the same as that of the flat surface portion 81 in the circumferential direction. The first curved surface portion 93 has a front end in conformance with the curved end portion 82. That is, the front end of the first curved surface portion 93 is in contact with the curved end portion 82.

Figure 6:
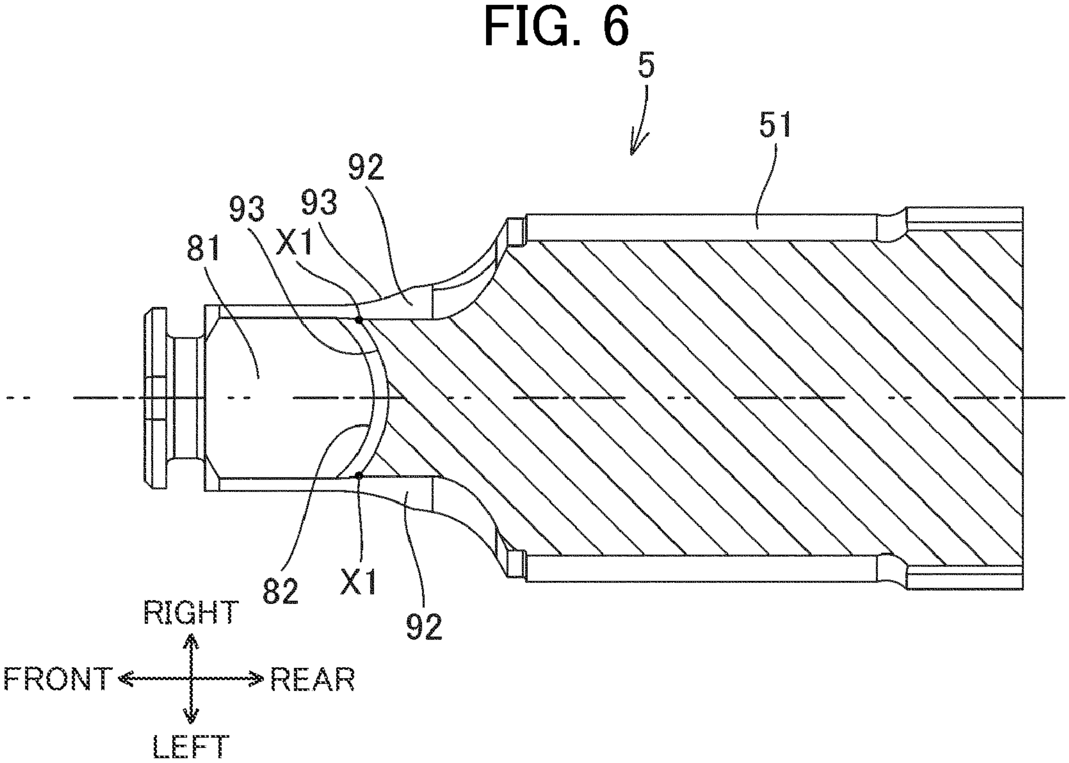
FIG. 6 is a cross-sectional view of the anvil taken along a line VI-VI of FIG. 5 according to the embodiment of the present invention.

The first curved surface portion 93 is recessed rearward. This configuration will be described in detail. FIG. 6 is a cross-sectional view of the anvil 5 taken along a plane parallel to the flat surface portion 81 and passing through the first curved surface portion 93 (the plane passes along the line VI-VI in FIG. 5). In the cross-section illustrated in FIG. 6, the first curved surface portion 93 is positioned between two cross-sectional parts of the uniform diameter surface portions 92 in the circumferential direction (or the leftward/rightward direction). The first curved surface portion 93 is recessed rearward from connecting points X1 at which the first curved surface portion 93 is connected to the two cross-sectional parts of the uniform diameter surface portions 92. In the cross-section, radius of curvature of the first curved surface portion 93 may be uniform, or may be continuously changed.

As illustrated in FIG. 3, the second curved surface portion 94 is recessed rearward, and has a generally sector shape surrounded by the sloped surface portion 91, the uniform diameter surface portion 92, and the first curved surface portion 93. Specifically, the second curved surface portion 94 has a front end having generally arcuate shape and connected to a rear end of the first curved surface portion 93. The second curved surface portion 94 has a rear end portion generally V-shaped. The V-shaped rear end portion of the second curved surface portion 94 has a front end portion connected to the uniform diameter surface portion 92, and has a remaining rear end portion connected to a front end portion of the sloped surface portion 91.

Figure 7:
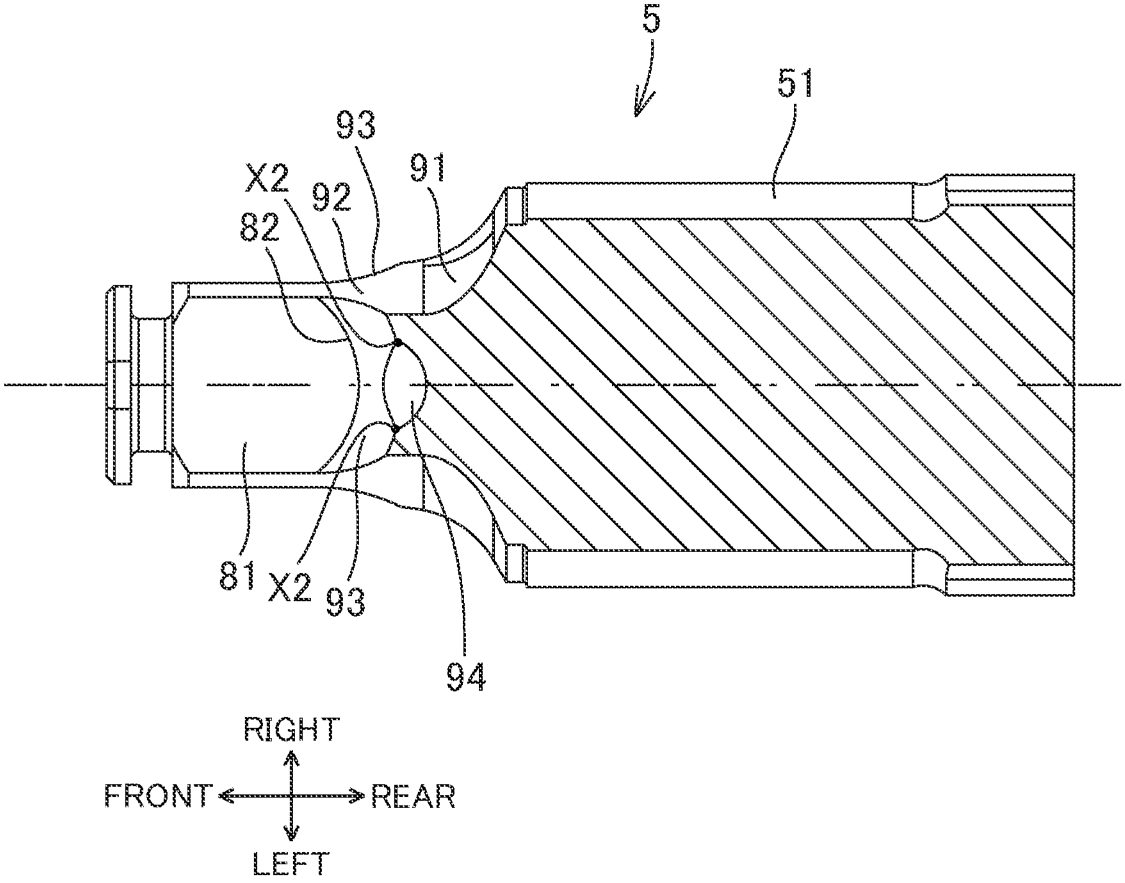
FIG. 7 is a cross-sectional view of the anvil taken along a line VII-VII of FIG. 5 according to the embodiment of the present invention.

FIG. 7 is a cross-sectional view of the anvil 5 taken along a plane that is positioned above the cross-sectional plane of FIG. 6, is parallel to the flat surface portion 81, and passes through the second curved surface portion 94 (the plane passes along the line VII-VII in FIG. 5). In the cross-section illustrated in FIG. 7, the second curved surface portion 94 is positioned between the two cross-sectional parts of the first curved surface portions 93 in the circumferential direction (or the leftward/rightward direction). The second curved surface portion 94 is recessed rearward from connecting points X2 at which the second curved surface portion 94 is connected to the two cross-sectional parts of the first curved surface portion 93. In the cross-section, radius of curvature of the second curved surface portion 94 may be uniform, or may be continuously changed. A relationship between the first curved surface portion 93 and the two uniform diameter surface portions 92 shown in FIG. 7 is the same as that shown in FIG. 6. That is, the first curved surface portion 93 is recessed rearward from connecting points at which the first curved surface portion 93 is connected to the two cross-sectional parts of the uniform diameter surface portions 92. In this cross-section shown in FIG. 7, radius of curvature of the first curved surface portion 93 may be uniform, or may be continuously changed.

Figure 8:
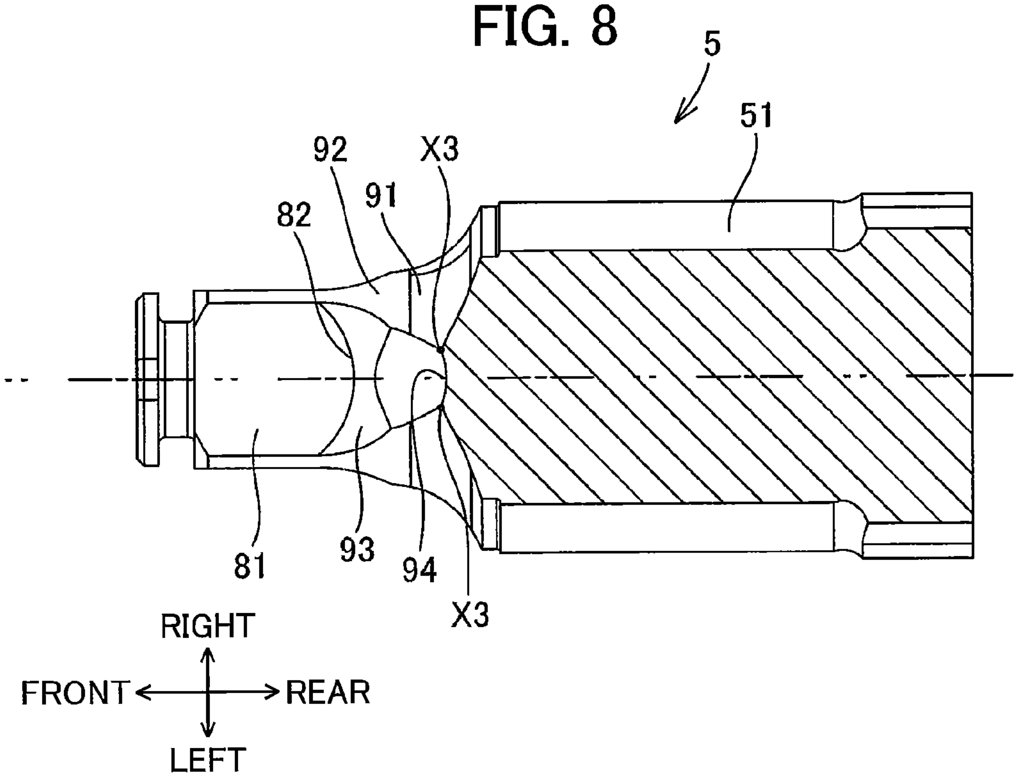
FIG. 8 is a cross-sectional view of the anvil taken along a line VIII-VIII of FIG. 5 according to the embodiment of the present invention.

FIG. 8 is a cross-sectional view of the anvil 5 taken along a plane that is positioned above the cross-sectional plane of FIG. 7, is parallel to the flat surface portion 81, and passes through the second curved surface portion 94. In the cross-section illustrated in FIG. 8, the second curved surface portion 94 is positioned between the two cross-sectional parts of the sloped surface portion 91 in the circumferential direction (or the leftward/rightward direction). The second curved surface portion 94 is recessed rearward from connecting points X3 at which the second curved surface portion 94 is connected to the two cross-sectional parts of the sloped surface portion 91.

Figure 9:
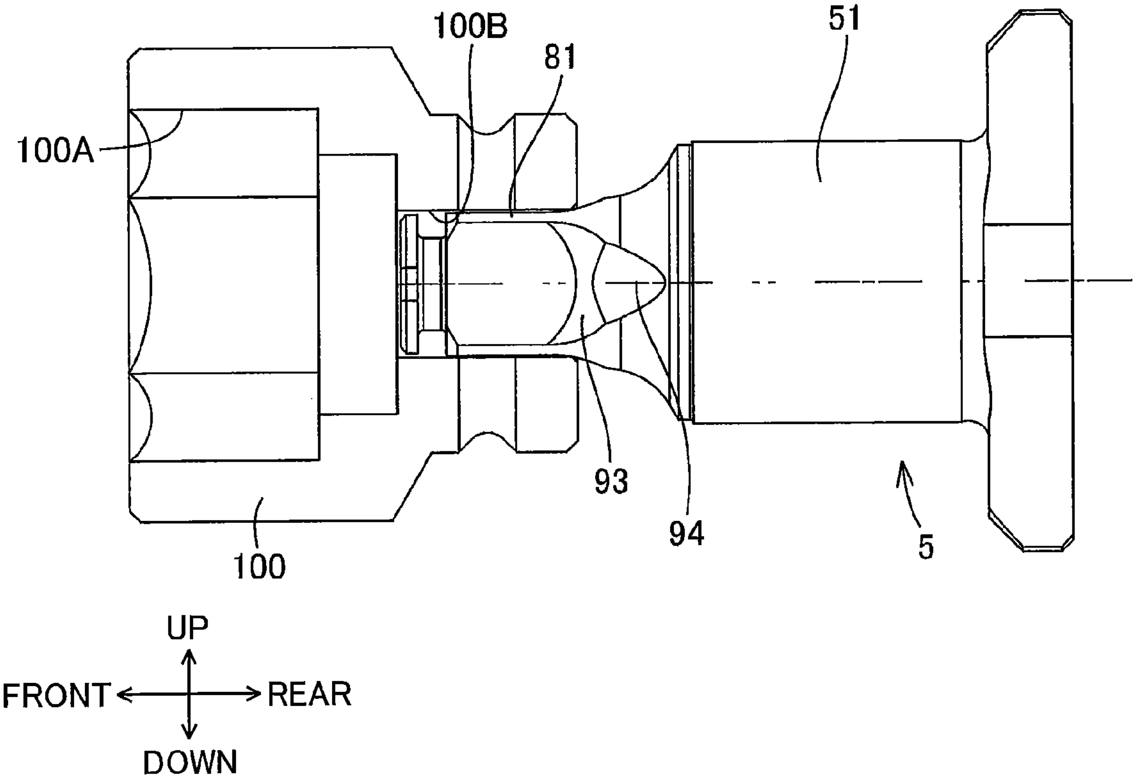
FIG. 9 is a cross-sectional view of the anvil according to the embodiment of the present invention and a socket attached to the anvil.
Figure 12:
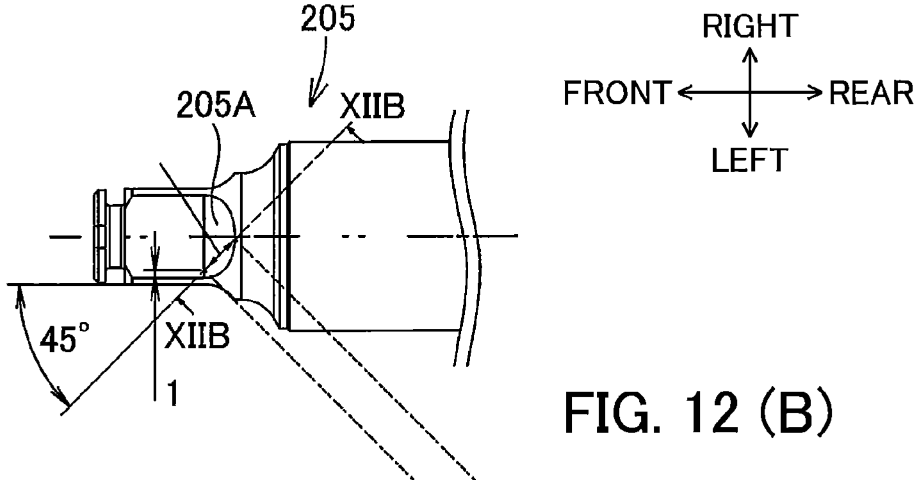
FIG. 12 is a view illustrating an anvil according to a comparative example 1, where (A) is a plan view of the anvil, (B) is a cross-sectional view taken along a line XIIB-XIIB of (A), and (C) is a cross-sectional view of the anvil taken along a plane similar to FIG. 6.
Figure 12:
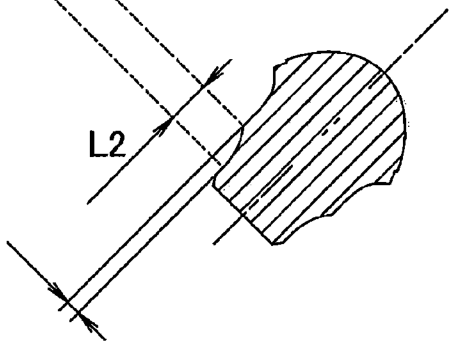
Figure 12:
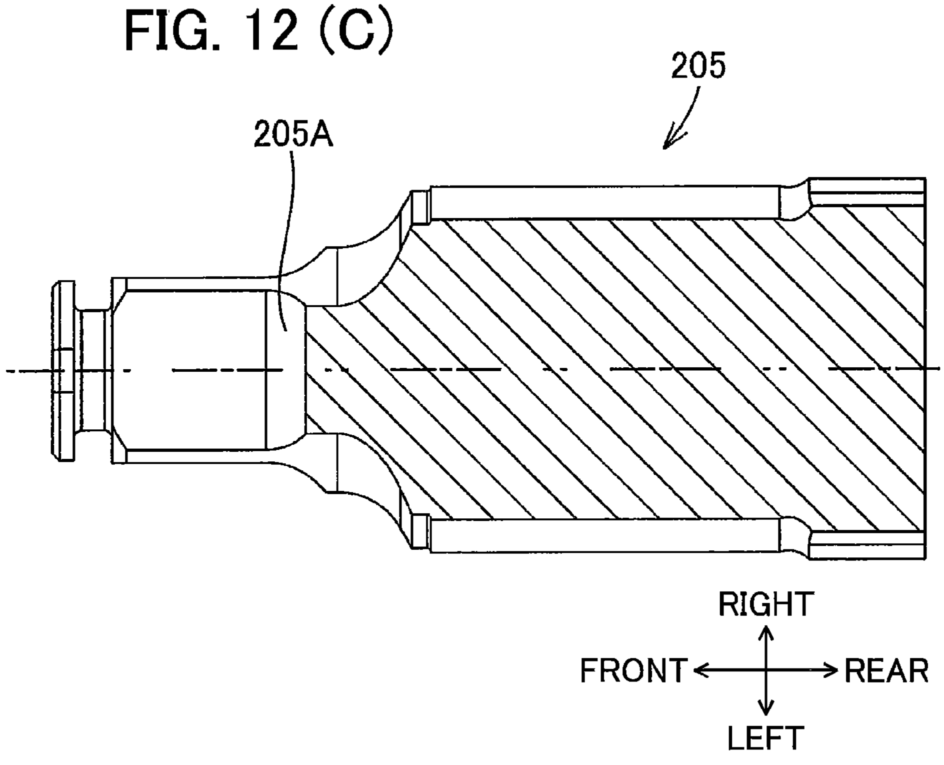

As illustrated in FIG. 9, the socket 100 is formed with a front bore 100A and a rear bore 100B. The rear bore 100B is square shape in a rear view, in which the tip end portion 80 of the anvil 5 is configured to be received. The socket 100 is non-detachably attached to the anvil 5 by an engagement of a ball (not illustrated) provided in the socket with the anvil 5. The front bore 100A has a hexagonal shape configured to receive a fastener such as a bolt and a nut.

As illustrated in FIG. 10, the flat surface portion 81, the curved end portion 82, the first curved surface portion 93, and the second curved surface portion 94 of the anvil 5 are formed by machining a metallic member 55 having generally solid cylindrical shape employing a first end mill 130 and a second end mill 131. The cylindrical metallic member 55 has a first outer peripheral surface portion 55A corresponding to the sloped surface portion 91 and a second outer peripheral portion 55B corresponding to the uniform diameter surface portion 92 over an entire circumference.

Here, the first end mill 130 has a tip end portion having a rotation axis extending in the frontward/rearward direction, and the tip end portion has a tapered surface 130A whose diameter is gradually reduced toward its tip end (rearward). Further, the second end mill 131 has a tip end portion having a tapered surface 131A whose diameter is gradually reduced toward its tip end. Here, the tapered surface 131A has a tapering degree gentler than that of the tapered surface 130A toward the tip.

For producing the anvil 5, firstly, the second outer peripheral surface portion 55B of the metallic member 55 is subjected to machining by the first end mill from the front end of the second outer peripheral surface portion 55B. Specifically, while position of the first end mill 130 in the upward/downward direction is maintained, the first end mill 130 is moved from right to left to form the flat surface portion 81. In this case, depth in the cutting direction (frontward/rearward direction) of the first end mill 130 is changed to form the curved end portion 82. That is, the first end mill 130 is moved so that cutting depth at the center portion in the leftward/rightward direction of the metallic member 55 becomes the largest. By such cutting operation to the metaling member 55 while moving the first end mill 130, the first curved surface portion 93 is formed as a result of cutting by the tapered surface 130A. That is, in the cross-section parallel to the upward/downward direction and the frontward/rearward direction, the first curved surface portion 93 provides a sloped shape parallel to the tapered surface 130A of the first end mill 130.

Then, the second curved surface portion 94 is formed employing the second end mill 131. At this time, the second end mill 131 performs cutting to an upper side of the thus formed first curved surface portion 93 and the center portion in the leftward/rightward direction of the first outer peripheral surface portion 55A. In this case, depth in the cutting direction of the second end mill 131 is set greater than the depth in the cutting direction for forming the first curved surface portion 93. Hence, the second curved surface portion 94 is formed. That is, in the cross-section parallel to the upward/downward direction and the frontward/rearward direction, the second curved surface portion 94 provides a shape parallel to the tapered surface 131A of the second end mill 131.

Next, fastening operation employing the impact wrench 1 according to the embodiment of the present invention will be described.

Firstly, the anvil 5 is inserted in the rear bore 100B of the socket 100, and the user inserts the fastener such as the bolt in the front bore 100B of the socket 100. Upon rotation of the spindle 41 by the motor 2, the balls 42, the hammer 46, and the anvil 5 are rotated together with the spindle 41 to start fastening operation to the fastener.

In accordance with an increase in load applied to the anvil due to progress in the fastening operation, the rotating hammer 46 is retracted against the urging force of the spring 43. At this time, the balls 43 move rearward in the grooves 41*a*. Then, engagement between the hammer 46 and the anvil 5 is released when the pawl 46B climbs over the blade 52, and the hammer 46 is released from the anvil 5. Then, elastic energy accumulated in the spring 43 is discharged, so that the hammer 46 rotationally moves frontward through the balls 42 relative to the spindle 41. Hence, one of the pawls 46B of the hammer 46 collides with one of the blades 52 of the anvil, and simultaneously, remaining one of the pawls 46B collides with remaining one of the blades 52, thereby engaging the hammer 46 and the anvil 5 with each other. Accordingly, impact force is imparted on the blade 52.

After the collision of the pawls 46B with the blades 52, the rotating hammer 46 is retracted against the urging force of the spring 43. Engagement between the hammer 46 and the anvil 5 is released when the pawl 46B climbs over the blade 52, and the hammer 46 is released from the anvil 5. Then, elastic energy accumulated in the spring 43 is discharged, so that the hammer 46 moves frontward. Hence, the pawls 46B again collide with the blades 52, so that rotational force of the hammer 46 and the spring 43 is transmitted to the anvil 5. In this way, the anvil 5 rotates together with the socket 100 attached to the tip end portion 80 by the rotational impact of the hammer 46. Therefore, the impact wrench 1 performs operation for fastening the fastener such as the screw and the bolt.

In the anvil 5 according to the present embodiment, concentration of stress applied to the anvil 5 during fastening operation can be reduced by the curved end portion 82 and the first curved surface portion 93 continuous with the curved end portion 82. This point will be described with reference to FIGS. 11(A) through 12(C). FIG. 11 (A) is a plan view of the anvil 5. FIG. 11(B) is a cross-sectional view taken along the line XIB-XIB of FIG. 11(A). The line XIB-XIB is a linear line inclined by 45 degrees in counterclockwise direction with respect to the frontward/rearward direction. This line is parallel to a direction of principal stress of a stress (hereinafter simply referred to as a distortion stress) generated at a left rear end portion P1 of the flat surface portion 81 due to distortion of the anvil 5 during operation of the impact wrench 1. Incidentally, at the impact operation in a case where the anvil 5 rotates in a rotating direction R (FIG. 3), vertical impact stress applied to a portion ambient to the left rear end portion P1 of the flat surface portion 81 is the largest stress among the vertical stress applied to the flat surface portion 81 during impact operation. For the simplicity, the second curved surface portion 94 is not illustrated in FIGS. 11(A) and 11(B). Here, the vertical impact stress is generated by the vertical component of force applied to the flat surface portion 81, the vertical component being perpendicular to the flat surface portion 81 when the socket 100 collides with the flat surface portion 81.

FIGS. 12(A) through 12(C) illustrate an anvil 205 according to a comparative example 1. The anvil 205 illustrated in FIG. 12(A) has a flat surface portion 205A instead of the first curved surface portion 93. The anvil 205 does not have the curved end portion 82 but has a liner end at a rear end of the flat surface portion. FIG. 12(B) is a cross-sectional view taken along the line XIIB-XIIB of FIG. 12(A). The line XIIB-XIIB is a linear line inclined by 45 degrees in the counter clockwise direction with respect to the frontward/rearward direction. FIG. 12(C) is a cross-sectional view of the anvil 205 taken along the plane similar to the plane illustrated in FIG. 6. The flat surface portion 205A has a linear shape on this cross section.

The anvil 205 is produced by machining to the metallic member 55 by means of the first end mill 130 similar to the production of the anvil 5. However, for forming the flat surface portion, depth in the cutting direction of the first end mill 130 is maintained constant, so that the rear end of the flat surface portion can be linear in shape. With such a machining, the flat surface portion 205A is formed by the tapered surface 130A of the first end mill 130. Hence, the flat surface portion 205A of the anvil 205 is generally coincident with the tapered surface 130A in the cross-section taken along the plane (corresponding to the plane in FIG. 10) parallel to the frontward/rearward direction and the upward/downward direction. That is, in the cross-section, shape and length of the flat surface portion 205A are approximately the same as those of the first curved surface portion 93. The shape of the anvil 205 according to the comparative example 1 is the same as that of the anvil 5 other than the point described above.

The first curved surface portion 93 illustrated in FIG. 11(B) has a length L1 in the direction of the line XIB-XIB (direction of principal stress) is greater than a length L2 illustrated in FIG. 12(B) of the flat surface portion in the direction of XIIB-XIIB (this direction is identical to the direction of XIB-XIB). Further, the first curved surface portion 93 has a radius of curvature larger than that of the flat surface portion. Hence, the anvil 5 can restrain stress concentration at the rear end portion P1 of the left end portion of the flat surface portion 81 in comparison with the stress concentration occurring in the anvil 205.

Further, in the anvil 5 according to the present embodiment, large displacement amount of the metallic material constituting the anvil 5 and positioned along the line XIB-XIB can be provided when the anvil 5 is distorted, since the second curved surface portion 94 is formed. Hence, force acting in the direction of principal stress can be escaped, thereby restraining stress concentration.

Figure 14:
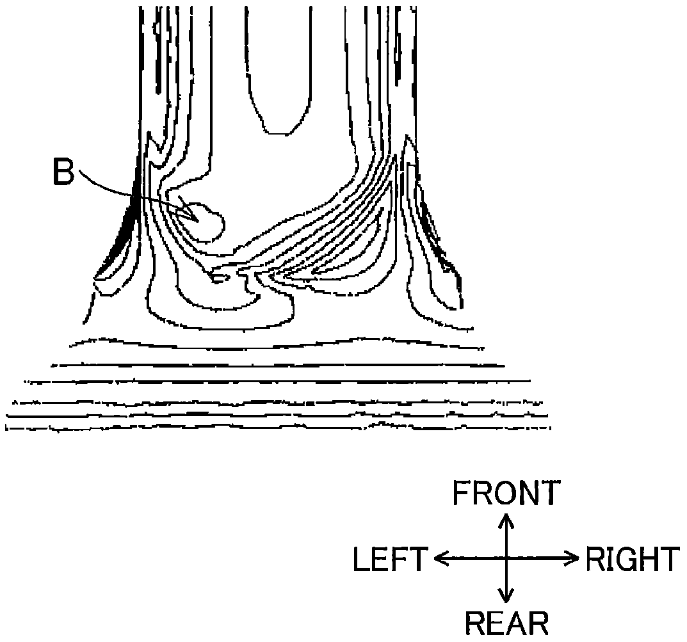
FIG. 14 is a graph representing stress distribution in an anvil according to a comparative example 2.
Figure 15:
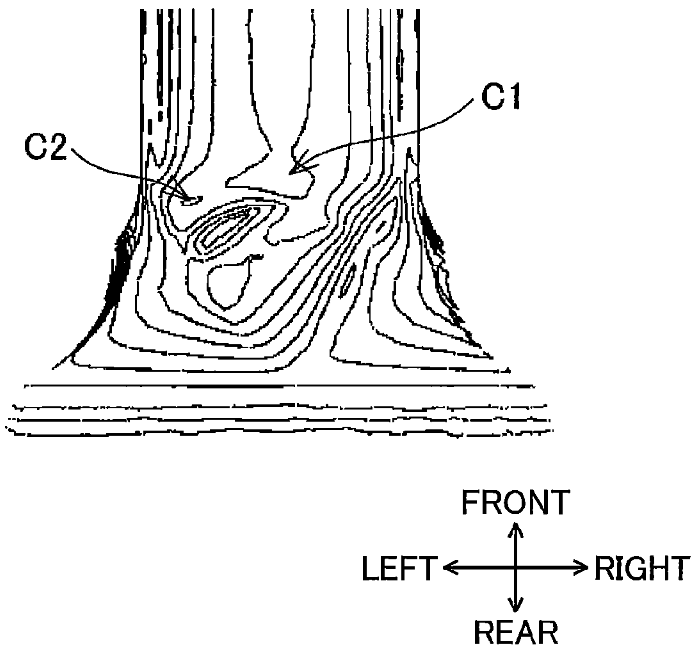
FIG. 15 is a graph representing stress distribution in an anvil according to a comparative example 3.
Figure 16:
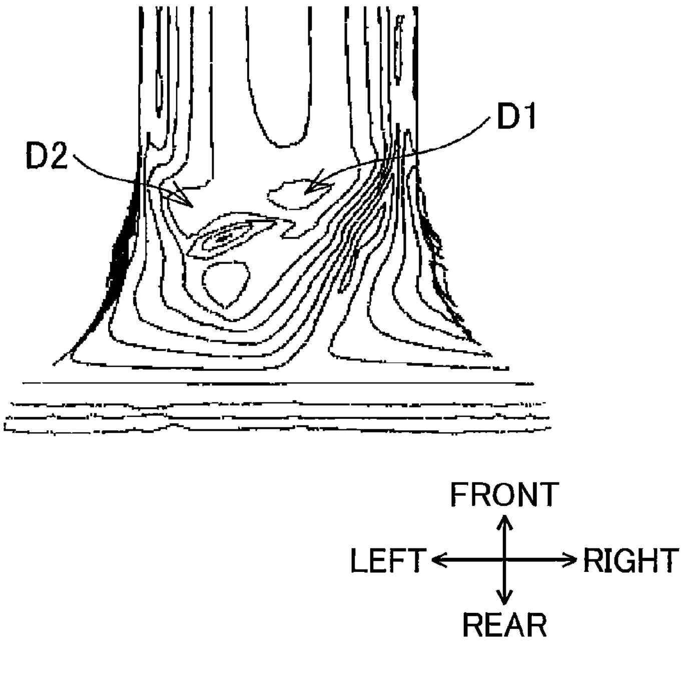
FIG. 16 is a graph representing stress distribution in the anvil according to the embodiment of the present invention.

The above-described effect will be described in more detail. FIGS. 13 through 16 show analytical results of distributions of distortion stress with respect to the anvils according to the comparative examples 1 through 3 (FIGS. 13 through 15), and the anvil 5 according to the present embodiment (FIG. 16). In the analysis, in order to evaluate stress generated due to simple distortion, the front end portion of the anvil was fixed, while the rear end portion of the anvil was applied with moment of 100 N·m in the rotational direction R (FIG. 3). (This was the condition for the analysis). The lines illustrated in FIGS. 13 through 16 are iso-stress contours formed by connecting together the points having the same value of the principal stress component of the distortion stress generated under the above-described condition. Further, the analyzed range shown in FIGS. 13 through 16 is the range containing the flat surface portion of the anvil.

Figure 13:
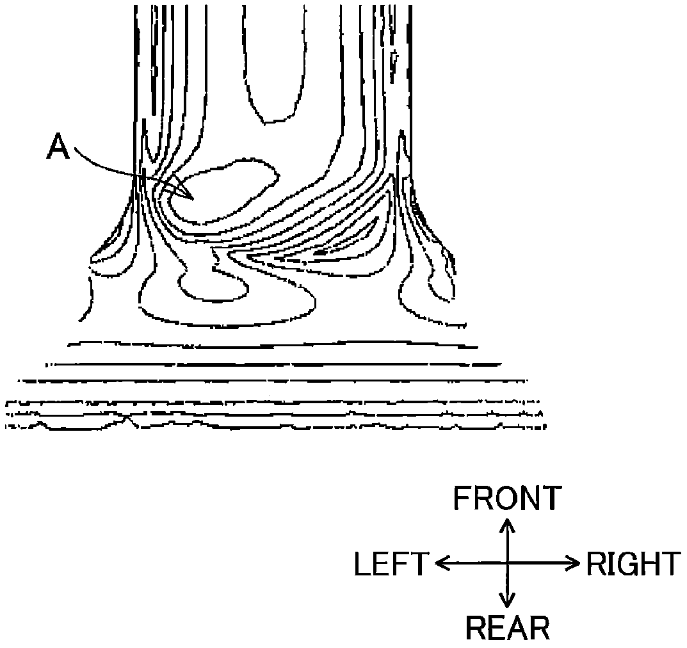
FIG. 13 is a graph representing stress distribution in the anvil according to the comparative example 1.

FIG. 13 shows analytic result with respect to the anvil 205 according to the comparative example 1 illustrated in FIGS. 12(A) and 12(B). FIG. 14 shows analytic result with respect to the anvil according to the comparative example 2 where the first curved surface portion 93 was formed but the second curved surface portion 94 was not formed (In FIG. 11, the second curved surface portion 94 is omitted for simplicity to facilitate explanation. The configuration of the comparative example 2 was the same as the configuration represented by FIG. 11). FIG. 15 shows analytic result with respect to the anvil according to the comparative example 3 where the second curved surface portion 94 was formed and the first curved surface portion was not formed, and the flat surface portion the same as the flat surface portion 205 was formed instead of the first curved surface portion 93. FIG. 16 shows analytic result with respect to the anvil 5 according to the present embodiment. Incidentally, the anvils according to the comparative examples 2 and 3 is the same as the anvil 5 except the points described above.

As shown in FIG. 13, distortion stress with the maximum stress of 253 MPa was generated at a region A. The reason A was the periphery in the flat surface portion (corresponding to the flat surface portion 81 of the present embodiment) and contained the portion corresponding to the left rear end portion P1 of FIG. 12(A). That is, in the anvil according to the comparative example 1, the region A provided maxim distortion stress and maximum vertical impact stress applied to the flat surface portion (corresponding to the flat surface portion 81 of the present embodiment). Therefore, the region A has a high degree of possibility of being a starting point toward breakage of the anvil.

As shown in FIG. 14, maximum distortion stress of 240 MPa was generated at a region B. The region B was positioned adjacent to the left rear end portion P1. However, the region B had an area smaller than that of the region A. Further, the maximum stress of 240 Ma was smaller than the maximum stress of 254 MPa generated in the comparative example 1. In view of the foregoing, according to the analytic result, stress concentration occurring in the comparative example 2 is lesser than that occurring in the comparative example 1.

As illustrated in FIG. 15, maximum distortion stress of 243 MPa was generated at a region C1. Further, the second highest distortion stress of 234 MPa was generated at a region C2. The region C1 was positioned frontward and rightward of the regions A and B in FIGS. 13 and 14, respectively. The region C2 was positioned adjacent to the rear end portion P1 of the left end portion. However, the region C2 had an area smaller than that of the region B. Further, the maximum distortion stress was smaller than the maximum stresses generated in the regions A and B. Analytic result with respect to the comparative example 3 reveals that concentration of distortion stress is restrained because of the second curved surface portion 94, and the portion where the maximum distortion stress is generated is shifted rightward and frontward of the portion where the vertical impact stress is generated.

As illustrated in FIG. 16, maximum distortion stress of 240 MPa was generated at a region D1. Further, the second highest distortion stress of 228 MPa was generated at a region D2. The region D1 was positioned frontward and rightward of the regions A and B in FIGS. 13 and 14, respectively, and the region D1 had an area far smaller than that of the region C1. The region D2 contained a left region of a base end portion of the anvil. However, the distortion stress in the region D2 was lower than that in the regions A, B and C2.

The above analytic results show that maximum value of the distortion stress generated in the anvil 5 according to the present embodiment is lower than the maximum value of the distortion stress generated in the comparative examples 1 through 3. Further, the region where the maximum distortion stress is generated is different from the region where the maximum vertical impact stress is generated.

That is, in the anvil 5 according to the present embodiment, total value of the vertical impact stress and distortion stress in the region (substantially containing the region D2) where the maximum vertical impact stress is provided can be reduced, since the maximum value of the distortion stress is low and low distortion stress is provided in the region (substantially containing the region D2). That is, stress concentration occurring at a specific portion can be restrained. Accordingly, probability of damage to the anvil 5 can be lowered.

Next, an anvil 105 according to one modification will be described. In the following description, like parts and components of the anvil 105 will be designated by the same reference numerals as those shown in the anvil 5 according to the above-described embodiment to avoid duplicating description.

Figure 17:
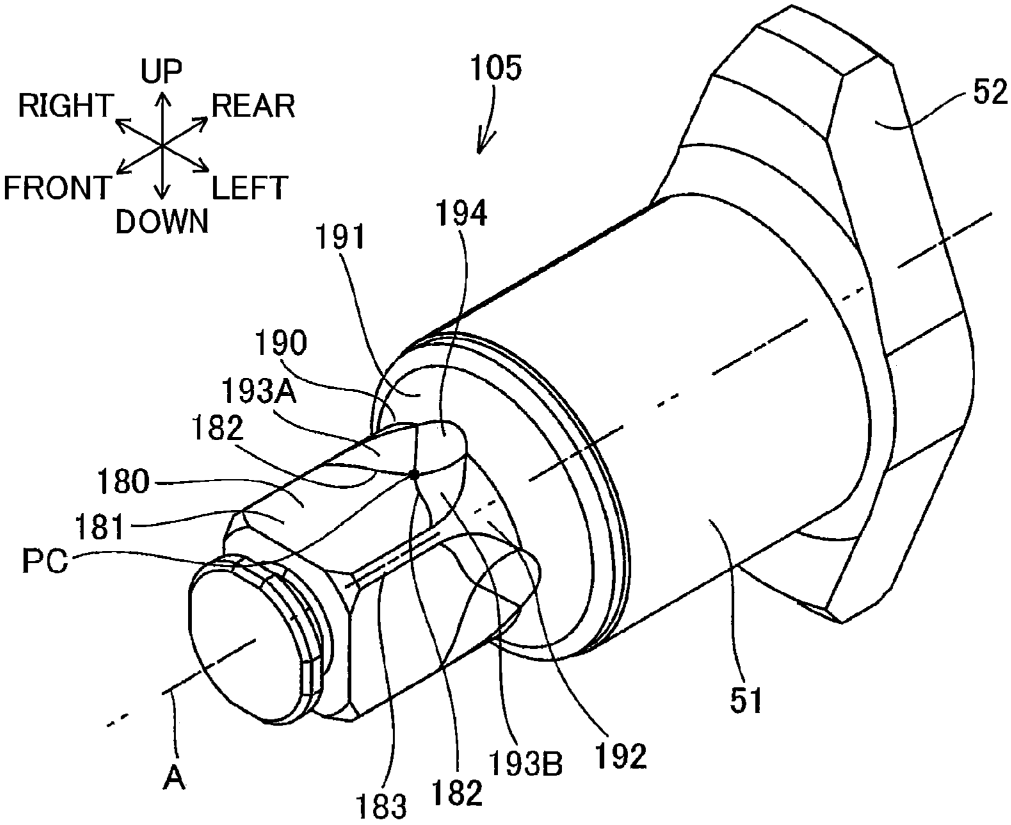
FIG. 17 is a perspective view of an anvil according to a modification.
Figure 18:
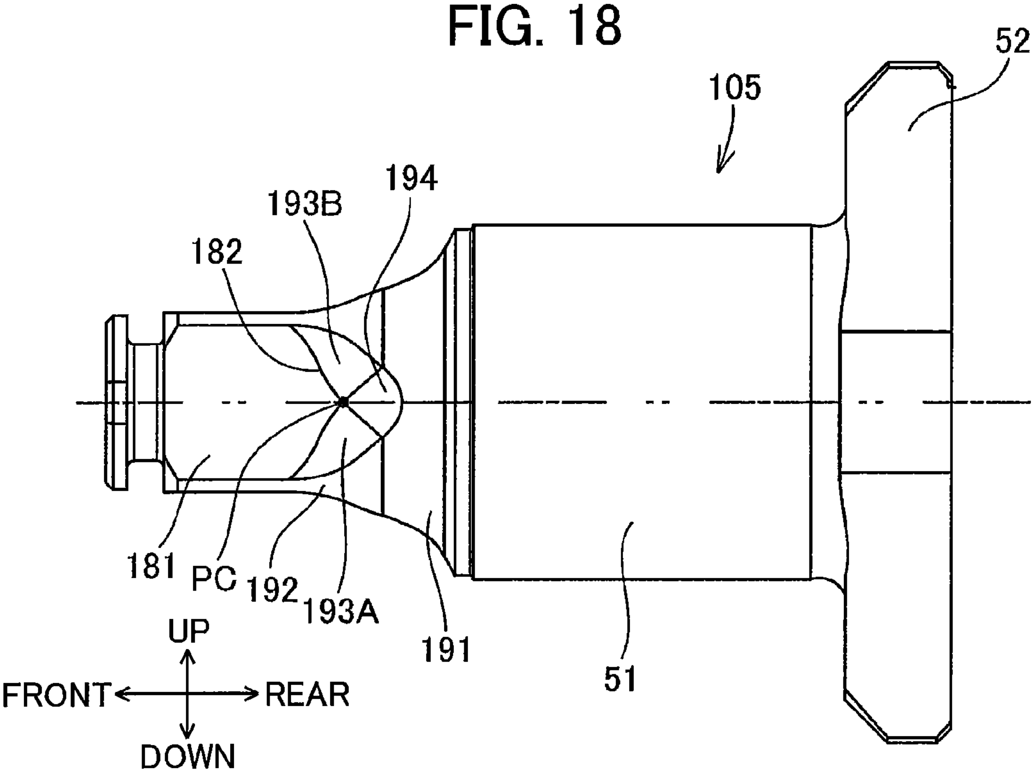
FIG. 18 is a side view of the anvil according to the modification.
Figure 19:
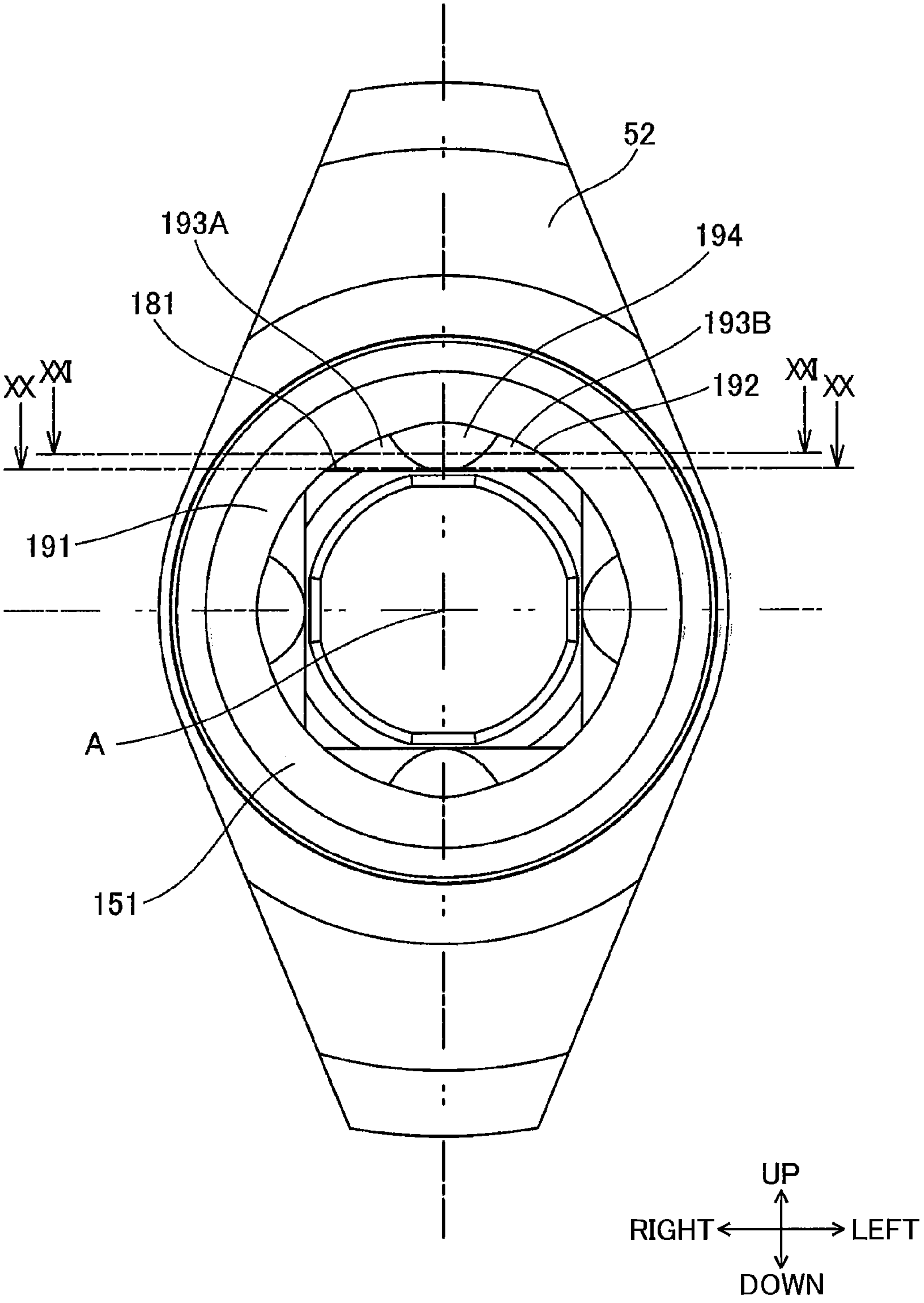
FIG. 19 is a front view of the anvil according to the modification.

As illustrated in FIGS. 17 through 19, the anvil 105 includes a large diameter portion 51, a pair of blade portions 52, a tip end portion 180, and a connecting portion 190 for connecting together the large diameter portion 51 and the tip end portion 180.

The tip end portion 180 is positioned at a front end of the large diameter portion 51. The tip end portion 180 has generally square shape in the front view to which the socket 100 (FIG. 9) as the end bit is attachable. Specifically, the front end portion 180 has four flat surface portions 181 each having generally square shape (FIG. 5), and four corner portions 183 chamfered. The front end portion 180 is symmetrical about the axis A thorough rotation of every 90 degrees. Accordingly, the four flat surface portions 181 are symmetrically positioned about the axis A through rotation of 90 degrees. Neighboring two flat surface portions 181 are connected to each other by the corner portion 183. The corner portions 183 extend in the frontward/rearward direction.

In the following description, an uppermost flat surface portion 181 among the four flat surfaces 181 illustrated in FIG. 17 will be described. As described above, since the four flat surface portions 181 are symmetrically positioned about the axis A through rotation of every 90 degrees, configuration of the four flat surface portions 181 are identical to one another. Therefore, description as to the remaining flat surface portions 181 will be omitted.

A curved end portion 182 is formed at a rear end of the flat surface portion 181. The curved end portion 182 has a shape recessed rearward. Specifically, the curved end portion 182 is positioned between two corner portions 183 (an upper left corner portion 183 and an upper right corner portion 183). The curved end portion 182 has a rearmost end positioned at a center point PC of the curved end portion in the leftward/rightward direction (the center point PC being positioned at equal distance from the two corner portions 183). The curved end portion 182 has a discontinuous curvature.

The connecting portion 190 includes a sloped surface portion 191, four uniform diameter surface portions 192, four first curved surface portions 193A (as an example of a recessed portion and a first recessed portion), four first curved surface portions 193B (as an example of a recessed portion and a first recessed portion), and four second curved surface portions 194 (as an example of a recessed portion and a second recessed portion). The connecting portion 190 has rotational symmetries through every 90 degrees about the axis A. Accordingly, the four uniform diameter surface portions 192, the four first curved surface portions 193A, the four first curved surface portions 193B, and the four second curved surface portions 194 are respectively symmetrically positioned about the axis A through rotation of every 90 degrees. In the following description, an uppermost first curved surface portion 193A, an uppermost first curved surface portion 193B, an uppermost second curved surface portion 194 connected to the uppermost first curved surface portions 193A, 193B, and two upper most uniform diameter surface portions 192 illustrated in FIG. 17 will only be described while omitting description as to remaining first curved surface portions 193A, 193B, remaining second curved surface portions 194, and remaining uniform diameter portions 192.

The sloped surface portion 191 is generally cylindrical with its radius (a distance from the axis A to an outer peripheral surface of the sloped surface portion 191) gradually reduced in frontward direction. The sloped surface portion 191 has a rear end connected to a front end of the large diameter portion 51. The sloped surface portion 191 has a front end connected to a rear end of the uniform diameter surface portion 192 and a rear end of the second curved surface portion 194. The sloped surface portion 191 is inclined toward the axis A in the frontward direction.

The uniform diameter surface portion 192 has a constant radius (from the axis A to an outer peripheral surface of the uniform diameter surface portion 192). The radius of the uniform diameter surface portion 192 is smaller than the radius of the large diameter portion 51 and not more than the radius of the sloped surface portion 191. Each uniform diameter surface portion 192 is at an angular position the same as that of a corner portion 183 in the circumferential direction. The uniform diameter surface portion 192 has a front end connected to the corner portion 183.

The first curved surface portions 193A, 193B are positioned between two uniform diameter surface portions 192 in the leftward/rightward direction (or circumferential direction). Each of the first curved surface portions 193A, 193B has generally triangular shape, and is symmetric with each other with respect to a plane parallel to the front ward/rearward direction and the upward/downward direction and passing through the point PC. The first curved surface portion 193A is positioned rightward of the first curved surface portion 193B, and apexes of the first curved surface portions 193A and 193B are coincident with the point PC.

The first curved surface portions 193A and 193B are at angular positions the same as that of the flat surface portion 181 in the circumferential direction. The first curved surface portions 193A and 193B have front ends in conformance with the curved end portion 182. That is, the front ends of the first curved surface portions 193A and 193B are in contact with the curved end portion 182.

Figure 20:
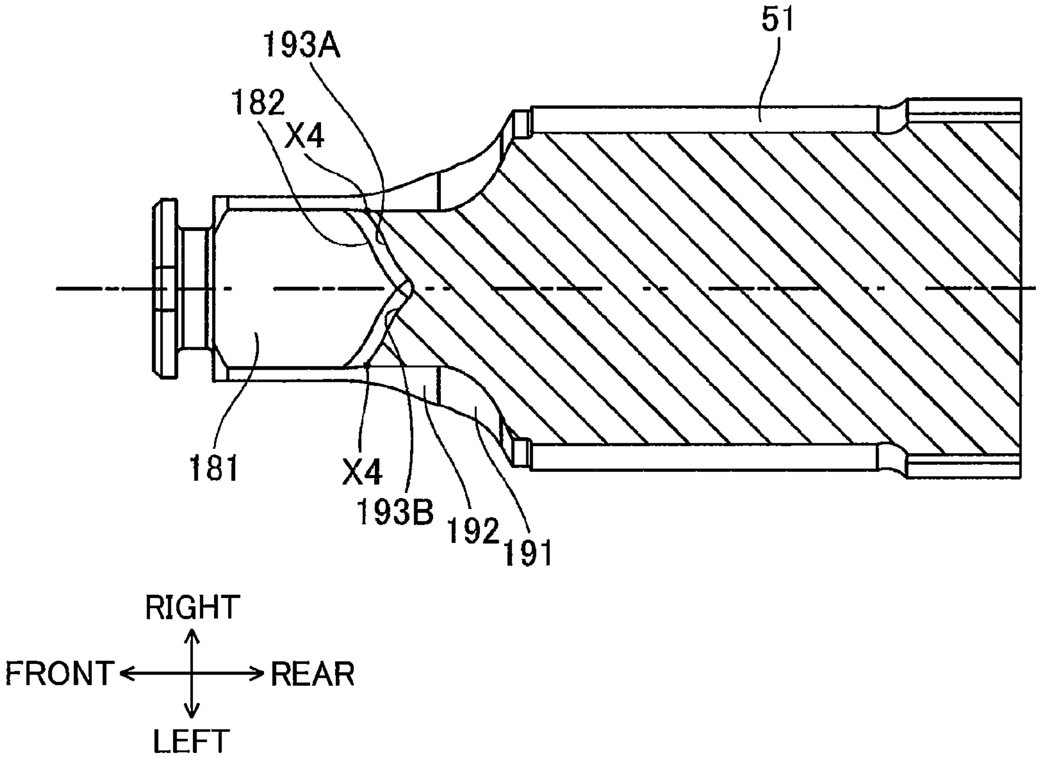
FIG. 20 is a cross-sectional view of the anvil taken along a line XX-XX of FIG. 19 according to the modification.

The first curved surface portions 193A and 193B are recessed rearward. This configuration will be described in detail. FIG. 20 is a cross-sectional view of the anvil 105 taken along a plane matching the flat surface portion 181 (the plane passing along the line XX-XX in FIG. 19). In the cross-section illustrated in FIG. 20, the first curved surface portion 193A has a right end (or one end in the circumferential direction) connected to the uniform diameter surface portion 192, and the first curved surface portion 193B has a left end (or another end in the circumferential direction) connected to the uniform diameter surface portion 192. The first curved surface portions 193A, 193B are recessed rearward from a connecting point X4 between the uniform diameter surface portion 192 and the first curved surface portions 193A and from another connecting point X4 between the uniform diameter surface portion 192 and the first curved surface portions 193B. In FIG. 20, if the first curved surface portion 193A and the first curved surface portion 193B is regarded as a single curved line, the radius of curvature of the single curved line is discontinuously changed. Incidentally, the radius of curvature may be changed continuously.

As illustrated in FIG. 17, the second curved surface portion 194 is recessed rearward, and has a generally sector shape surrounded by the sloped surface portion 191, the first curved surface portion 193A, and the first curved surface portion 193B. Specifically, the second curved surface portion 194 has a rear end generally arcuate shaped, and is connected to the sloped surface portion 191. The second curved surface portion 194 has a front end having generally V-shape. An apex of the V-shape is coincident with the point PC. Remaining portion of the V-shape is connected to the first curved surface portions 193A, 193B.

Figure 21:
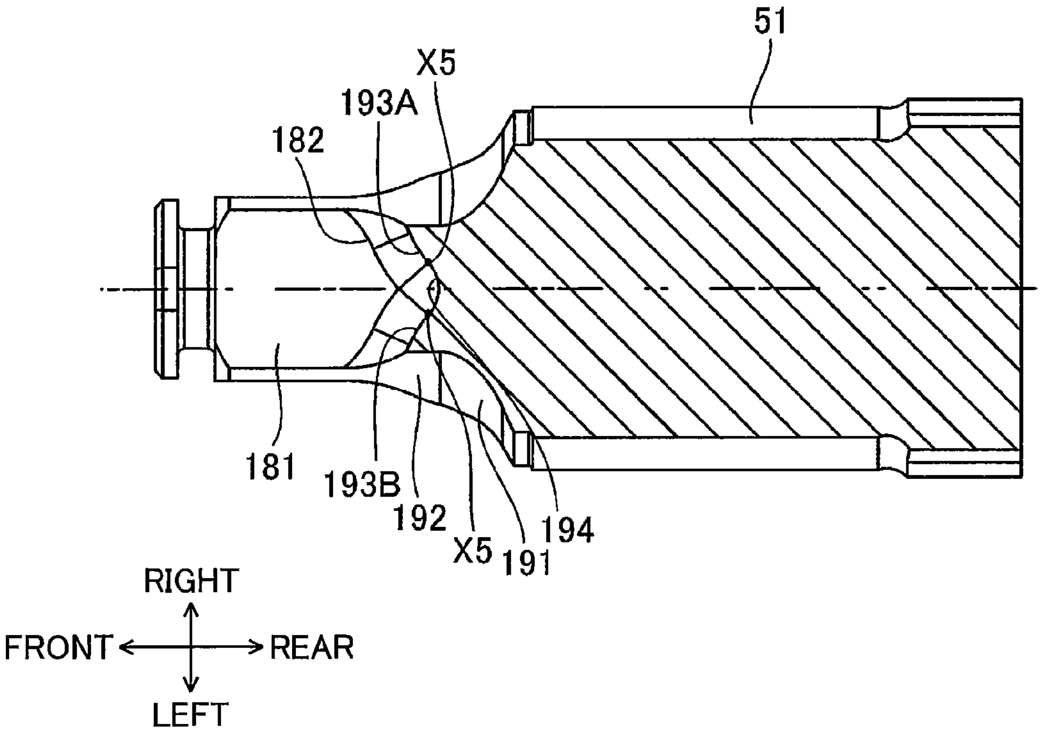
FIG. 21 is a cross-sectional view of the anvil taken along a line XXI-XXI of FIG. 19 according to the modification.

FIG. 21 is a cross-sectional view taken along a plane that is positioned above the cross-sectional plane of FIG. 20, is parallel to the flat surface portion 181, and passes through the first curved surface portions 193A, 193B and the second curved surface portion 194 (the plane passes along the line XXI-XXI in FIG. 19). In the cross-section illustrated in FIG. 21, the second curved surface portion 194 is positioned between the first curved surface portion 193A and the first curved surface portion 193B in the circumferential direction (or the leftward/rightward direction). The second curved surface portion 194 has generally an arcuate shape recessed rearward from the first curved surface portions 193A, 193B. Specifically, the second curved surface portion 194 is recessed rearward from connecting points X5 at which the first curved surface portions 193A and 193B are connected to the second curved surface portion 194. Incidentally, also in FIG. 21, the first curved surface portions 193A, 193B are positioned rearward of the connecting points at which the uniform diameter surface portions 192 are connected to the first curved surface portions 193A, 193B.

Incidentally, in the cross-section taken along a plane positioned above the plane for the cross-section of FIG. 21 and in parallel to the flat surface portion 181, the second curved surface portion 194 is connected to the sloped surface portion 191. Similar to the cross-section illustrated in FIG. 8 pertaining to the above-described embodiment, the second curved surface portion 194 is positioned between the two cross-sectional parts of the sloped surface portion 191 in the circumferential direction (or the leftward/rightward direction). The second curved surface portion 194 is recessed rearward from connecting points at which the second curved surface portion 194 is connected to the two cross-sectional parts of the sloped surface portion 191.

Similar to the method of producing the anvil 5 with reference to FIG. 10, the anvil 105 is produced by machining a metallic member 55. The metallic member 55 has a first outer peripheral surface portion 55A corresponding to the sloped surface portion 191 and a second outer peripheral portion 55B corresponding to the uniform diameter surface portion 192.

The first curved surface portions 193A, 193B are formed by cutting the metallic member 55 by means of a first end mill 130 in a manner similar to the formation of the first curved surface portion 93 according to the above embodiment. However, the first end mill 130 is moved so that the depth in the cutting direction is the deepest at a center portion in the leftward/rightward direction of the metallic member 55 in a manner to form the curved end portion 182.

For the formation of the second curved surface portion 194, upper portions of the first curved surface portions 193A, 193B are cut and a center portion in the leftward/rightward direction of the first outer peripheral surface portion 55A is cut. When the second curved surface portion 194 is formed, the first end mill 130 is moved so that depth in the cutting direction is deeper than the depth for forming the first curved surface portions 193A, 193B. That is, the second end mill 131 is not employed, but only the first end mill 130 is used for forming the first curved surface portions 193A, 193B and the second curved surface portion 194.

Figure 22:
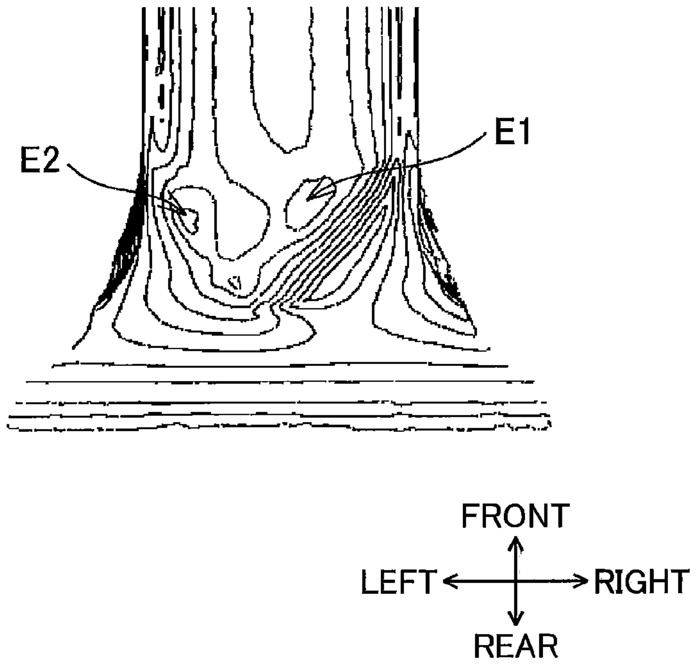
FIG. 22 is a graph representing stress distribution in the anvil according to the modification.

FIG. 22 shows analytic result showing distribution of distortion stress generated in the anvil 105. Condition for the analysis was the same as the condition employed in connection with FIGS. 13 through 16.

As shown in FIG. 22, maximum distortion stress of 248 MPa was generated at a region E1. Further, second highest distortion stress of 235 MPa was generated at a region E2. The region E1 was positioned frontward and rightward of the regions A in FIG. 13, and the region E1 was at a position different from the region A where maximum vertical impact stress was distributed. The region E1 had an area smaller than that of the region A. The value of the distortion stress at the region E1 was lower than that at the region A. The region E2 contained a region that is left end portion of a base end portion of the anvil (The region E2 corresponds to the region containing the rear end portion P1 of the left end portion in FIG. 11). However, the distortion stress applied to the region E2 was lower than that applied to the region A.

It is apparent from the analytic result that the anvil 105 according to the modified embodiment exhibits the effect the same as that of the anvil 5 according to the embodiment.

The impact tool according to the present invention is not limited to the above-described embodiments, but various changes and improvements may be made within a scope of claims.

For example, the second curved surface portion 94 may not be formed in the anvil 5 according to the embodiment. In this case, reduction in distortion stress can be achieved by the formation of the first curved surface portion 93 as understood from the analytic result shown in FIG. 14.

Alternatively, the first curved surface portion 93 may not be formed in the anvil 5. In this case, provided that the second curved surface portion 94 is formed as understood from the analytic result shown in FIG. 14, distortion stress can be reduced and the portion at which the maximum stress is generated due to distortion can be displaced from the portion at which the maximum stress is generated due to impacting operation.

Further, at least one of the first curved surface portions 193A, 193B and the second curved surface portion 194 may not be formed in the modified embodiment.

The first curved surface portion 93 and the second curved surface portion 94 have common configuration in that the first curved surface portion 93 and the second curved surface portion 94 are recessed rearward (in an axial direction and directing from the tip end portion 80 toward the large diameter portion 51 as a base end portion) of the anvil 5. More specifically, in the cross-section extending in the frontward/rearward direction and the leftward/rightward direction, the first curved surface portion 93 and the second curved surface portion 94 have recessed shapes recessed from the portion connected to the outward portion thereof (the outward portion being the uniform diameter surface portion 92 which is outward of the first curved surface portion 93, or being the uniform diameter surface portion 92 or the sloped surface portion 91 which are outward of the second curved surface portion 94). That is, the connecting portion 90 should have a curved surface recessed rearward (in the axial direction). In other words, in the cross-section taken along a plane parallel to the flat surface portion 81, the anvil 5 may have a configuration such that the inward surface is recessed from at least a part of an outward surface outward of the inward surface in the circumferential direction.

In the cross-sections illustrated in FIGS. 6 through 8, the first curved surface portion 93 and the second curved surface portion 94 have generally arcuate shape. However, these portions may not have the generally arcuate shape as long as these have curved lines recessed rearward, such as parabolic curve.

The second curved surface portion 94 is not contacted with the flat surface portion 81. However, a part of the second curved surface portion 94 may be in contact with the flat surface portion 81.

The rotation axis of the rotor 22 of the motor 2 is coaxial with the axis A of the large diameter portion 51 of the anvil 5. However, the rotation axis and the axis A may be displaced from each other in the frontward/rearward direction or in the leftward/rightward direction.

In the cross-section illustrated in FIG. 10, the first curved surface portion 93 has a shape approximately coincident with the tapered surface 130A of the first end mill 130, and the second curved surface portion 94 has a shape approximately coincident with the tapered surface 131A of the second end mill 131. However, in the cross-section, the first curved surface portion 93 and the second curved surface portion 94 may have a shape other than the above. For example, in the cross-section, the first curved surface portion 93 and the second curved surface portion 94 may have generally arcuate shape recessed rearward.

REFERENCE SIGNS LIST

1: impact wrench, 2: motor, 3: gear mechanism, 4: impact mechanism, 5: anvil, 80; front end portion, 81: flat surface portion, 83: corner portion, 90: connecting portion, 91; sloped surface portion, 92: uniform diameter surface portion, 93: first curved surface portion, 94: second curved surface portion.

The invention claimed is:

1. An electric tool comprising:

a housing;

a motor accommodated in the housing and rotatable;

an anvil supported by the housing and rotatable about an axis; and an impact mechanism configured to convert a rotational force generated by the motor into a rotational impact force about the axis, and to apply the rotational impact force to the anvil;

wherein the anvil comprises:

a base portion rotatable relative to the housing;

an end bit attachment portion to which an end bit is attachable, and having a plurality of flat surface portions;

a plurality of corner portions each connecting two neighboring flat surfaces of the plurality of flat surface portions together; and a connecting portion integrally connecting together the base portion and the end bit attachment portion, the connecting portion having:

a sloped surface portion, a diameter of the sloped surface portion being gradually reduced in a direction from the base portion toward the end bit attachment portion;

a plurality of uniform diameter surface portions, a front end of the sloped surface portion being connected to rear ends of the plurality of uniform diameter surface portions, front ends of the plurality of uniform diameter surface portions being connected to respective ones of the rear ends of the plurality of corner portions; and a plurality of first recessed portions that are recessed from the connecting portion and arranged around a circumference of the connecting portion at positions corresponding to positions of the flat surface portions, wherein each of the first recessed portions includes:

a front curved end portion formed at a rear end of a corresponding one of the plurality of flat surface portions, the front curved end portion being positioned between two corner portions of the plurality of corner portions and having an arcuate shape having a rearmost portion positioned at a center of the front curved end portion in a leftward/rightward direction;

a rear curved end portion formed rearward of the front curved end portion; and a curved surface portion located between the front curved end portion and the rear curved end portion, the front curved end portion and the rear curved end portion being curved with respect to an axial direction of the anvil and aligned with respect to each other in the axial direction, wherein the connecting portion has an outer peripheral surface portion where the plurality of recessed portions is formed, and wherein each first recessed portion is recessed, in the axial direction from the end bit attachment portion toward the base portion, from connecting points where the first recessed portion is connected to two cross-sectional parts of the plurality of uniform diameter surface portions in a cross-section taken along a plane parallel to the flat surface portion and passing through the recessed portion.

2. The electric tool according to claim 1, wherein at least one of the first recessed portions is in contact with a corresponding one of the plurality of the flat surface portions.

3. The electric tool according to claim 1, wherein the plurality of first recessed portions is in contact with respective ones of the plurality of flat surface portions, and wherein the connecting portion further includes a plurality of second recessed portions separated from each flat surface portion.

4. The electric tool according to claim 1, wherein at least one of the plurality of first recessed portions has a curved-line shape recessed in the axial direction in the cross-section.

5. The electric tool according to claim 1, wherein at least one of the plurality of first recessed portions has an arcuate shape recessed in the axial direction in the cross-section.

6. The electric tool according to claim 1, wherein at least one of the plurality of first recessed portions has a parabolic-curve shape recessed in the axial direction in the cross-section.

7. An electric tool comprising:

a housing;

a motor accommodated in the housing and rotatable;

an anvil supported by the housing and rotatable about an axis; and an impact mechanism configured to convert a rotational force generated by the motor into a rotational impact force about the axis, and to apply the rotational impact force to the anvil;

wherein the anvil comprises:

a base portion rotatable relative to the housing;

an end bit attachment portion to which an end bit is attachable, and having a plurality of flat surface portions;

a plurality of corner portions each connecting two neighboring flat surfaces of the plurality of flat surface portions together; and a connecting portion integrally connecting together the base portion and the end bit attachment portion, the connecting portion having:

a sloped surface portion, a diameter of the sloped surface portion being gradually reduced in a direction from the base portion toward the end bit attachment portion;

a plurality of uniform diameter surface portions, a front end of the sloped surface portion being connected to rear ends of the plurality of uniform diameter surface portions, front ends of the plurality of uniform diameter surface portions being connected to respective ones of the rear ends of the plurality of corner portions; and a plurality of first recessed portions that is recessed from the connecting portion and arranged around a circumference of the connecting portion at positions corresponding to positions of the flat surface portions, wherein each of the first recessed portions includes:

a front curved end portion formed at a rear end of a corresponding one of the plurality of flat surface portion, the front curved end portion being positioned between two corner portions of the plurality of corner portions and having an arcuate shape having a rearmost portion positioned at a center of the front curved end portion in a leftward/rightward direction;

a rear curved end portion formed rearward of the front curved end portion; and a curved surface portion located between the front curved end portion and the rear curved end portion, the front curved end portion and the rear curved end portion being curved with respect to an axial direction of the anvil and aligned with respect to each other in the axial direction.

8. The electric tool according to claim 7, wherein each first recessed portion is recessed, in the axial direction from the end bit attachment portion toward the base portion, from connecting points where the first recessed portion is connected to two cross-sectional parts of the plurality of uniform diameter surface portions in a cross-section taken along a plane parallel to the flat surface portion and passing through the first recessed portion.

9. The electric tool according to claim 7, wherein each of at least one of the plurality of first recessed portions is in contact with a corresponding one of the plurality of flat surface portions.

10. The electric tool according to claim 7, wherein the plurality of first recessed portions is in contact with respective ones of the plurality of flat surface portions, and wherein the connecting portion further has a plurality of second recessed portions each respectively separated from corresponding ones of the flat surface portions.

* * * * *